US 12,221,350 B2

(12) United States Patent
Black et al.

(10) Patent No.: US 12,221,350 B2
(45) Date of Patent: Feb. 11, 2025

(54) CONTINUOUS CARBONACEOUS MATTER THERMOLYSIS AND PRESSURIZED CHAR ACTIVATION WITH HYDROGEN PRODUCTION

(71) Applicants: John Wright Coulter Black, Markham (CA); Russel Mark Adams, Penryn, CA (US)

(72) Inventors: John Wright Coulter Black, Markham (CA); Russel Mark Adams, Penryn, CA (US)

(73) Assignees: John Wright Coulter Black, Markham (CA); Russel Mark Adams, Penryn, CA (US)

( * ) Notice: Subject to any disclaimer, the term of this patent is extended or adjusted under 35 U.S.C. 154(b) by 0 days.

(21) Appl. No.: 18/412,327

(22) Filed: Jan. 12, 2024

(65) Prior Publication Data

US 2024/0190709 A1     Jun. 13, 2024

Related U.S. Application Data

(63) Continuation of application No. PCT/US2023/023453, filed on May 24, 2023, which
(Continued)

(51) Int. Cl.
*C01B 32/39*      (2017.01)
*C01B 32/378*    (2017.01)

(52) U.S. Cl.
CPC ............ *C01B 32/39* (2017.08); *C01B 32/378* (2017.08); *C01B 2210/0014* (2013.01); *C01B 2210/0051* (2013.01)

(58) Field of Classification Search
CPC .......... C01B 32/378; C01B 2210/0014; C01B 2210/0051
(Continued)

(56) References Cited

U.S. PATENT DOCUMENTS

| 5,096,463 A | 3/1992 | Beierte |
| 5,173,921 A | 12/1992 | Gaylord |

(Continued)

FOREIGN PATENT DOCUMENTS

| CN | 107022364 B | 3/2018 |
| WO | 2013/036694 A1 | 3/2013 |
| WO | 2020/148551 A2 | 7/2020 |

OTHER PUBLICATIONS

Nikolaidis, P. et al., "A Comparative Overview of Hydrogen Production Processes," Renewable and Sustainable Energy Reviews 67 (2017), 597-611, Elsevier, Amsterdam, NL.
(Continued)

*Primary Examiner* — Anita Nassiri-Motlagh
(74) *Attorney, Agent, or Firm* — SQUIRE PATTON BOGGS (US) LLP

(57) ABSTRACT

Provided herein are apparatuses, systems, and methods useful for continuous thermolysis of carbonaceous matter. In certain aspects and embodiments, the invention presents continuous thermolysis of carbonaceous matter in a controlled temperature and steam environment to produce a low volatility char, with subsequent steam activation of the char under pressure producing activated carbon and pressurized syn-gas, all of which are carried out in a reactor system including one or more vessels. The syn-gas is enriched in hydrogen in a high temperature shift reactor and separated in a pressurized swing adsorber to provide a pressurized pure hydrogen stream and a low-pressure combustible tail gas.

35 Claims, 6 Drawing Sheets

Related U.S. Application Data is a continuation of application No. 17/664,753, filed on May 24, 2022, now Pat. No. 11,834,338.

(58) Field of Classification Search
USPC .......................................................... 423/461
See application file for complete search history.

(56) References Cited

U.S. PATENT DOCUMENTS

| | | |
|---|---|---|
| 5,955,039 A | 9/1999 | Dowdy |
| 6,061,384 A | 5/2000 | Koslow |
| 7,771,668 B2 | 8/2010 | Chashi |
| 7,981,835 B2 | 7/2011 | Srinivasachar |
| 8,192,647 B2 | 6/2012 | Chornet |
| 8,715,582 B1 | 5/2014 | Decker |
| 8,999,885 B2 | 4/2015 | Majmudar |
| 9,446,975 B2 | 9/2016 | Nickerson |
| 9,624,109 B2 | 4/2017 | Srinivasachar |
| 9,746,242 B2 | 8/2017 | Giebelhausen |
| 2006/0130401 A1 | 6/2006 | Giglio |
| 2009/0317320 A1 | 12/2009 | Srinivasachar et al. |
| 2012/0116135 A1 | 5/2012 | Gong |
| 2015/0329365 A1 | 11/2015 | Srinivasachar |
| 2019/0337809 A1 | 11/2019 | Adams et al. |
| 2020/0385273 A1 | 12/2020 | Dunnigan |

OTHER PUBLICATIONS

Menendez-Diaz, J. et al., "Types of Carbon Adsorbents and Their Production", In Activated Carbon Surfaces in Environmental Remediation (Interface Science and Technology Series, 7), T. Bandosz, Ed., 2006, 1-48, Elsevier, Amsterdam, NL.

International Search Report and Written Opinion issued in corresponding International Application No. PCT/US2023/023453 on Aug. 21, 2023.

CONTINUOUS CARBONACEOUS MATTER THERMOLYSIS AND PRESSURIZED CHAR ACTIVATION WITH HYDROGEN PRODUCTION

CROSS-REFERENCE TO RELATED APPLICATIONS

This application is a continuation application based on International Patent Application (PCT) No. PCT/US23/23453 (filed May 24, 2023), which is based on U.S. application Ser. No. 17/664,753 (filed May 24, 2022; now U.S. Pat. No. 11,834,338), both of which are hereby incorporated herein by reference. This application claims the benefit of its priority for all material that is disclosed in the parent application.

FIELD

The present invention relates to thermal transformation of carbonaceous matter into char and subsequent steam activation of the char under pressure with recovery of hydrogen and other combustible volatile materials and the concurrent production of power.

BACKGROUND OF THE INVENTION

Activated carbon is a versatile adsorbent extensively used for the removal of contaminants from both liquids and gases to purify desired materials or to capture specific toxins. Activated carbons are manufactured from carbonaceous materials such as biomass, coal, lignite, peat, or petroleum coke using two separate pathways—thermal treatment with mildly oxidizing reactants (e.g., steam or carbon dioxide), or a chemical approach involving degradation with acidic materials, such as zinc chloride, or dehydration with alkalis, including potassium hydroxide. While the chemical procedure is faster and generally occurs at lower temperatures, the added costs of chemical removal and treatment of the resulting wastewater limit this approach. According to J. A. Menéndez-Díaz et al. ("Activated carbon surfaces in environmental remediation," in Interface Science and Technology Series, 7, Elsevier 2006), "Steam activation is the most widely used method for producing activated carbons in the world."

Hydrogen, a potential co-product of carbon activation, is extensively used in the refining and chemical industries, with emerging markets in the transportation sector and in energy storage. The various processes for producing hydrogen are well described in the paper "A comparative overview of hydrogen production processes" Nikolaidis et al., in Renewable and Sustainable Energy Reviews, 67(2017), 597. Conventionally, hydrogen is produced by the reaction of steam with natural gas, heavy oil, and coal. However, with the changing emphasis on minimizing carbon emissions, the focus has turned towards electrolysis, using green or nuclear electricity. An alternative approach, considered renewably sourced, is the thermal treatment of biomass (woody matter, agricultural residues, animal manures, etc.) to produce a tarry gas from which hydrogen can be recovered. Such a process is described in U.S. Pat. No. 8,192,647 (Chornet).

Conventional steam activation of carbonaceous material involves two sequential reaction steps:
(1) Thermal decomposition of the carbonaceous feed (pyrolysis, devolatilization, or carbonization) to remove the non-carbon elements hydrogen and oxygen, so that the resultant product char is enriched in carbon.
(2) Thermal activation of the devolatilized char through partial oxidation with high-temperature steam-containing gases to create a porous structure having extensive surface area.

The overall activation process is endothermic, and heat has to be added for the reactions to proceed. Typically, the necessary heat is provided by the combustion of the volatile gases and vapors released from the pyrolysis and activation reactions. In terms of an overall process energy balance, about 20% of the input energy is recovered in the form of activated carbon and another 25 to 35% is required for the process. Therefore about 45 to 55% is available for other purposes, but frequently it is lost to the environment, although there have been teachings to use the excess heat for power generation.

From the above description, it is seen that there is a need in the art to consistently, concurrently, and continuously produce from a variety of carbonaceous materials:
- activated carbon with low ash and a minimal Iodine Number of over 600 but preferably over 800 while providing a clean pressurized synthesis gas essentially free of nitrogen, tar, and dust from which renewable-source high-purity hydrogen can be extracted, by eliminating high-velocity process gases to minimize particulate carryover, attrition, dilution, motive power requirements, and gas clean-up costs,
- steam and power at maximum efficiency such that it is sufficient for process use but also available as renewable-source grid quality power for export, and
- co-products that are available in the pyrolysis off-gases but are never recovered.

In certain aspects of the present invention, the shortcomings of the prior art are resolved, in part by using steam as the process heat transfer medium, and additional advantages are realized as described herein.

SUMMARY OF THE INVENTION

In certain aspects and embodiments, the apparatus, system, and method of the invention present a system for continuous production of activated carbon, hydrogen, process steam, and electric power from biomass and other carbonaceous feedstocks, that includes a staged thermolysis reactor, an activation reactor, hydrogen separation equipment, and a power plant.

In certain embodiments of the staged thermolysis reactor, four separate thermal processes occur in sequence:
- Drying of the carbonaceous material with controlled direct steam heat such that the average particle temperature is raised to between 275 and 350° F. (135 to ca. 177° C.). With certain biomass feedstocks, the steam stripped vapor may be condensed to recover valuable essential oils.
- Torrefaction of the carbonaceous matter by increasing the dry feedstock temperature from 375 to 600° F. (ca. 191 to 316° C.) with steam acting both as a means of facilitating thermal control and as a reactant to enhance prompt decomposition of the carbonaceous material into volatile, but stable low molecular weight compounds and to promote early char formation while minimizing the overall thermal requirements for carbonization. Depending on the nature of the carbonaceous material, torrefaction can be exothermic.
- Pyrolysis of the torrefied material by raising its temperature to 750 to 1,050° F. (ca. 399 to 566° C.), driving off additional volatiles and producing pyrolysed char.

Devolatilization of the pyrolysed char using radiant electric heat to increase particle temperatures to 1,300 to 1,350° F. (ca. 704 to 732° C.) with steam acting primarily as a reactant but also as a sweep agent to remove the remainder of the volatiles from the char while improving the porosity of the char.

The scope of the invention also includes various combinations of the above-described four zones, for example, combining the drying and torrefaction zones, combining the torrefaction and pyrolysis zones, combining the pyrolysis and devolatilization zones, and combining the drying, torrefaction, and pyrolysis zones.

In each of these process steps, steam also acts as a carrier gas to sweep the volatile chemicals from the reaction environment and to avoid further polymerization into refractory chemicals. As desired, essential oils and other valuable chemicals can be recovered from the off-gases by venting them at particular temperature zones in the process through gas exit ports variously located on the upper surface of the containment vessel, followed by fractional condensation. Each of the zones is independently thermally controlled by steam temperature and flow. The respective process zones can be further subdivided to meet specific requirements to accommodate variations in the carbonaceous material, particle size, inlet moisture content, and the production of particular chemical compounds. Residence time can also be varied to meet the special properties of the various feedstocks, by controlling fill rate and conveyance speed.

Volatile materials from the drying, torrefaction, pyrolysis, and devolatilization zones flow to provide fuel for combustion apparatus to support steam raising and power generation. Optionally, carbon dioxide can be recovered for use or sequestration.

In certain embodiments, the activation reactor receives the char produced in the thermolysis reactor and is similar in construction. The activation reactor comprises an elongated, refractory insulation lined vessel, disposed horizontally or at an angle of up to 25 degrees above horizontal, capable of operation at pressures in the range of 150 to 1,000 psig, preferably in the range of 300 to 600 psig (e.g., about 150, 160, 170, 180, 190, 200, 225, 250, 275, 300, 325, 350, 375, 400, 425, 450, 475, 500, 525, 550, 575, or 600), in which is disposed a collinear longitudinal conveyance mechanism for continuously moving the char progressively from the inlet end to the discharge end at a speed that results in a residence time of the char of preferably at least 30 minutes, more preferably at least 45 minutes. Superheated steam is introduced at the working pressure through apertures, which can be located beneath the longitudinal conveyance apparatus, and an array of electric radiant heating elements, which can be mounted in the vapor space above the screw and add sufficient thermal energy to maintain a working temperature of up to 1,800° F. (ca. 982° C.), preferably in the range of 1,500 to 1,700° F. (ca. 816 to 927)° ° C. The synthesis gas from the activation reactor flows through hydrogen enrichment, heat recovery, purification, and compression apparatus where high purity hydrogen is produced. Residual tail gases from the purification apparatus provide fuel for additional steam raising and power generation. The tail gases contain about 60% carbon dioxide, and this can be recovered for use or sequestration.

In certain embodiments, the activation reactor uses radiant electric heat to provide the energy required by the endothermic activation reaction, with pressurized steam providing both reaction and sweep functions to convert the char into activated carbon and pressurized synthesis gas, both of which are separately discharged for further processing. Residence time and temperature are controlled as dictated by the nature and properties of the feedstock to produce various grades of activated carbon with Iodine Numbers at least 600 and preferably at least 800.

In certain embodiments, the apparatus incorporating the thermolysis and activation reactors may be contained in a single pressure vessel operated at a single pressure, with thermal decomposition of the feedstock to char occurring in a forward section and activation occurring in a rearward section and having a partial restriction located at the juncture of the thermal steam environments to minimize intermixing of the thermolysis product gases with the activation synthesis gas.

Other embodiments utilize two or more separate vessels for the thermolysis and activation reactors and if operating at a single pressure only requiring drop chutes between vessels, or if operating at two distinctly different pressures, separated by lock hoppers or similar devices isolating the pressure transitions. In these embodiments, disposing each vessel at an angle up to 25 degrees above horizontal facilitates placement of the array of vessels beside each other rather than stacking them. A further embodiment utilizes devolatilized char sourced externally but processed in a pressurized activation reactor as described above to produce commercial quality activated carbon, high purity hydrogen and power.

In certain embodiments [E-01], the invention provides a system for continuous, concurrent production of activated carbon, hydrogen, process steam, and electric power from carbonaceous matter, comprising a thermolysis reactor, wherein carbonaceous matter is processed in individually temperature-controlled zones for sequentially drying, torrefying, pyrolysing, and devolatilizing the carbonaceous matter to produce char and volatile materials, the thermolysis reactor comprising: a carbonaceous matter inlet, a char outlet, means for moving the carbonaceous matter from the carbonaceous matter inlet to the char outlet, means for admitting steam at various locations within the zones for sequentially drying, torrefying, pyrolysing, and devolatilizing the carbonaceous matter, a radiant electric heat distribution system acting to control the temperature within the devolatilization zone, and an array of volatile materials outlets; and a pressurized activation reactor, the pressurized activation reactor comprising: a char inlet, an activated carbon outlet, means for moving the char from the char inlet to the activated carbon outlet, means for admitting steam, the steam acting as a reactant for char activation, a radiant electric heat distribution system acting to provide the endothermic heat of reaction, and a gas outlet.

In certain aspects and embodiments [E-02] of the system, e.g., of embodiment [E-01], the system further comprises a power island, the power island providing power to the radiant electric heat distribution system, the power island further providing steam to the thermolysis reactor and the pressurized activation reactor.

In certain aspects and embodiments [E-03] of the system, e.g., embodiments [E-01] or [E-02], the char is reacted with pressurized steam to produce activated carbon and pressurized synthesis gas, and the system further comprises: means for recovering heat from the pressurized synthesis gas by generating steam while cooling and dehumidifying the pressurized synthesis gas and producing cooled and dehumidified pressurized synthesis gas; and a hydrogen purification system producing purified hydrogen and combustible tail gas from the cooled and dehumidified pressurized synthesis gas.

In certain embodiments [E-04], the invention provides a system for continuous, concurrent production of activated carbon, hydrogen, process steam, and electric power from carbonaceous matter, including:

- a thermolysis reactor, wherein carbonaceous matter is processed in individually temperature-controlled zones for sequentially drying, torrefying, pyrolysing, and devolatilizing the carbonaceous matter to produce char and volatile materials, the thermolysis reactor comprising a carbonaceous matter inlet, a char outlet, means for moving the carbonaceous matter from the carbonaceous matter inlet to the char outlet, means for admitting steam at one or more locations within the zones for sequentially drying, torrefying, pyrolysing, and devolatilizing the carbonaceous matter, the steam acting variously to facilitate chemical reactions, to sweep volatile materials out of the thermolysis reactor and to provide controlled thermal energy, a radiant electric heat distribution system acting to control the temperature within the devolatilization zone, and an array of volatile materials outlets, wherein the thermolysis reactor is conjoined with a pressurized activation reactor,
- the pressurized activation reactor, wherein the char is reacted with pressurized steam to produce activated carbon and pressurized synthesis gas, the pressurized activation reactor comprising: a char inlet, an activated carbon outlet, means for moving the char from the char inlet to the activated carbon outlet, means for admitting steam, the steam acting as a reactant for char activation, a radiant electric heat distribution system acting to provide endothermic heat of reaction, and a pressurized synthesis gas outlet;
- separation means at the junction of the thermolysis reactor and the pressurized activation reactor acting to effectively isolate the interior environment of the thermolysis reactor from the interior environment of the pressurized activation reactor while allowing passage of the char from the thermolysis reactor into the pressurized activation reactor;
- means for admitting carbonaceous feed into the thermolysis reactor and for discharging activated carbon from the pressurized activation reactor while maintaining the various working pressures therein and minimizing the ingress of air and egress of gases and vapors to atmosphere;
- means for recovering heat from the pressurized synthesis gas by generating steam while cooling and dehumidifying the pressurized synthesis gas and producing cooled and dehumidified pressurized synthesis gas;
- a hydrogen purification system producing purified hydrogen, and combustible tail gas, from the cooled and dehumidified pressurized synthesis gas;
- means for compression and storage of the purified hydrogen;
- a power island comprising means for combustion, process steam raising, heat exchange, and electric power generation, fueled by the volatile materials discharged from the thermolysis reactor and the tail gas discharged from the hydrogen purification system;
- means for delivering electric power from the power island to the radiant electric heat distribution systems of the thermolysis reactor and the pressurized activation reactor; and
- means for delivering steam from the power island to the thermolysis reactor and steam from the means for recovering heat from the pressurized synthesis gas to the pressurized activation reactor.

In certain aspects and embodiments, the system further comprises a shift reactor.

In certain aspects and embodiments [E-05] of the system, e.g., embodiments [E-01]-[E-04], the means for moving carbonaceous matter through the thermolysis reactor and the means for moving the char through the pressurized activation reactor is a screw means selected from the group including a single screw with cut flights, a single screw with mixing paddles, a shaftless screw, multiple identical screws, screws with flights having pitches differing along the shaft length, and screws with shaft diameter differing along the shaft length.

In certain aspects and embodiments [E-06] of the system, e.g., embodiments [E-01]-[E-05], the means for moving carbonaceous matter through the thermolysis reactor and the means for moving the char through the pressurized activation reactor variously is a traveling grate with mixing plows.

In certain aspects and embodiments [E-07] of the system, e.g., embodiments [E-01]-[E-06], the radiant electric heat distribution systems of the thermolysis reactor and the pressurized activation reactor comprise an array of individually replaceable electric radiant heating elements disposed inside protective temperature and pressure-resistant tubes and mounted substantially above the means for moving the carbonaceous matter through the thermolysis reactor and the means for moving the char through the pressurized activation reactor.

In certain aspects and embodiments [E-08] of the system, e.g., embodiments [E-01]-[E-07], the means for admitting steam of the thermolysis reactor is an array of apertures disposed along the bottom thereof, but separately within the individually thermally controlled zones for sequentially drying, torrefying, pyrolysing, and devolatilizing the carbonaceous matter, and the means for admitting steam of the pressurized activation reactor is through an array of apertures disposed along the bottom thereof.

In certain aspects and embodiments [E-09] of the system, e.g., embodiments [E-01]-[E-08], the torrefaction zone is operated at 375 to 600° F. (ca. 191 to 316° C.), the pyrolysis zone is operated at 750 to 1050° F. (ca. 399 to 566)° ° C., and the devolatilization zone is operated at 1300 to 1350° F. (ca. 704 to 732° C.).

In certain aspects and embodiments [E-10] of the system, e.g., embodiments [E-01]-[E-09], the drying and torrefaction zones, the torrefaction and pyrolysis zones, the pyrolysis and devolatilization zones, and the drying, torrefaction, and pyrolysis zones, are variously combined into single zones.

In certain aspects and embodiments [E-11] of the system, e.g., embodiments [E-01]-[E-10], the working pressure is in the range of 150 to 1,000 pounds per square inch gauge, and preferably in the range of 300 to 600 pounds per square inch gauge.

In certain aspects and embodiments [E-12] of the system, e.g., embodiments [E-01]-[E-11], the thermolysis reactor is operated at working pressures either the same as or differing from the working pressure in the pressurized activation reactor.

In certain aspects and embodiments [E-13] of the system, e.g., embodiments [E-01]-[E-12], the thermolysis reactor and the pressurized activation reactor are conjoined as a single reactor operated at a single working pressure.

In certain aspects and embodiments [E-14] of the system, e.g., embodiments [E-01]-[E-13], the pressurized activation reactor is inoperative.

In certain aspects and embodiments [E-15] of the system, e.g., embodiments [E-01]-[E-14], the thermolysis reactor is inoperative.

In certain aspects and embodiments [E-16] of the system, e.g., embodiments [E-03]-[E-15], the pressurized synthesis gas is enriched in hydrogen in a shift conversion reactor.

In certain aspects and embodiments [E-17] of the system, e.g., embodiments [E-03]-[E-16], the hydrogen purification system is a pressurized swing adsorber.

In certain aspects and embodiments [E-18] of the system, e.g., embodiments [E-01]-[E-17], the system further comprises means to recover selected chemicals by controlled condensation of a portion of the volatile materials discharged from the thermolysis reactor.

In certain aspects and embodiments [E-19] of the system, e.g., embodiments [E-01]-[E-18], a portion of the char produced in the thermolysis reactor is diverted and the remainder enters the char inlet of the pressurized activation reactor.

In certain aspects and embodiments [E-20] of the system, e.g., embodiments [E-04]-[E-19], the gases or vapors of the thermolysis reactor are used as a source of heat by a catalytic reformer. In certain aspects and embodiments [E-20A], the gases or vapors of the thermolysis reactor are heated before the reformer at least partially by gases exiting the reformer.

In certain aspects and embodiments [E-21] of the system, e.g., embodiments [E-04]-[E-20], vapors from steam thermolysis of carbonaceous materials in the thermolysis reactor are partitioned into three or more vapor streams.

In certain aspects and embodiments [E-22], the invention provides a method for continuous, concurrent production of activated carbon, hydrogen, process steam, and electric power from carbonaceous matter, comprising sequentially drying, torrefying, pyrolysing, and devolatilizing the carbonaceous matter in a series of zones of a thermolysis reactor by admitting steam to the zones, the steam acting to facilitate chemical reactions, to sweep volatile materials out of the thermolysis reactor and to provide controlled thermal energy, wherein a radiant electric heat distribution system controls the temperature within the devolatilization zone and an array of outlets permits release of volatile materials.

In certain aspects and embodiments [E-23], the method is followed by activating the resulting char in an activation reactor by admitting steam, the steam acting to facilitate the formation of pores in the char, wherein a radiant heat distribution system controls the temperature within the activation reactor, an outlet permits release of reaction product gases, and a separate outlet permits discharge of activated carbon product.

In certain aspects and embodiments [E-25] of the method, e.g., embodiment [E-23] or [E-24], the method further comprises activation of devolatilized carbonaceous material with steam in a second reactor.

In certain aspects and embodiments [E-26] of the method, e.g., embodiment [E-23]-[E-25], the method comprises or is performed with a system having the features of any of embodiments [E-01] to [E-21].

Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings, in which:

FIG. 2 depicts an embodiment of the inventive system employing a combined cycle gas turbine generator.

FIG. 3 depicts an embodiment of the inventive system employing a boiler and steam turbine generator.

DETAILED DESCRIPTION

Figure 1:
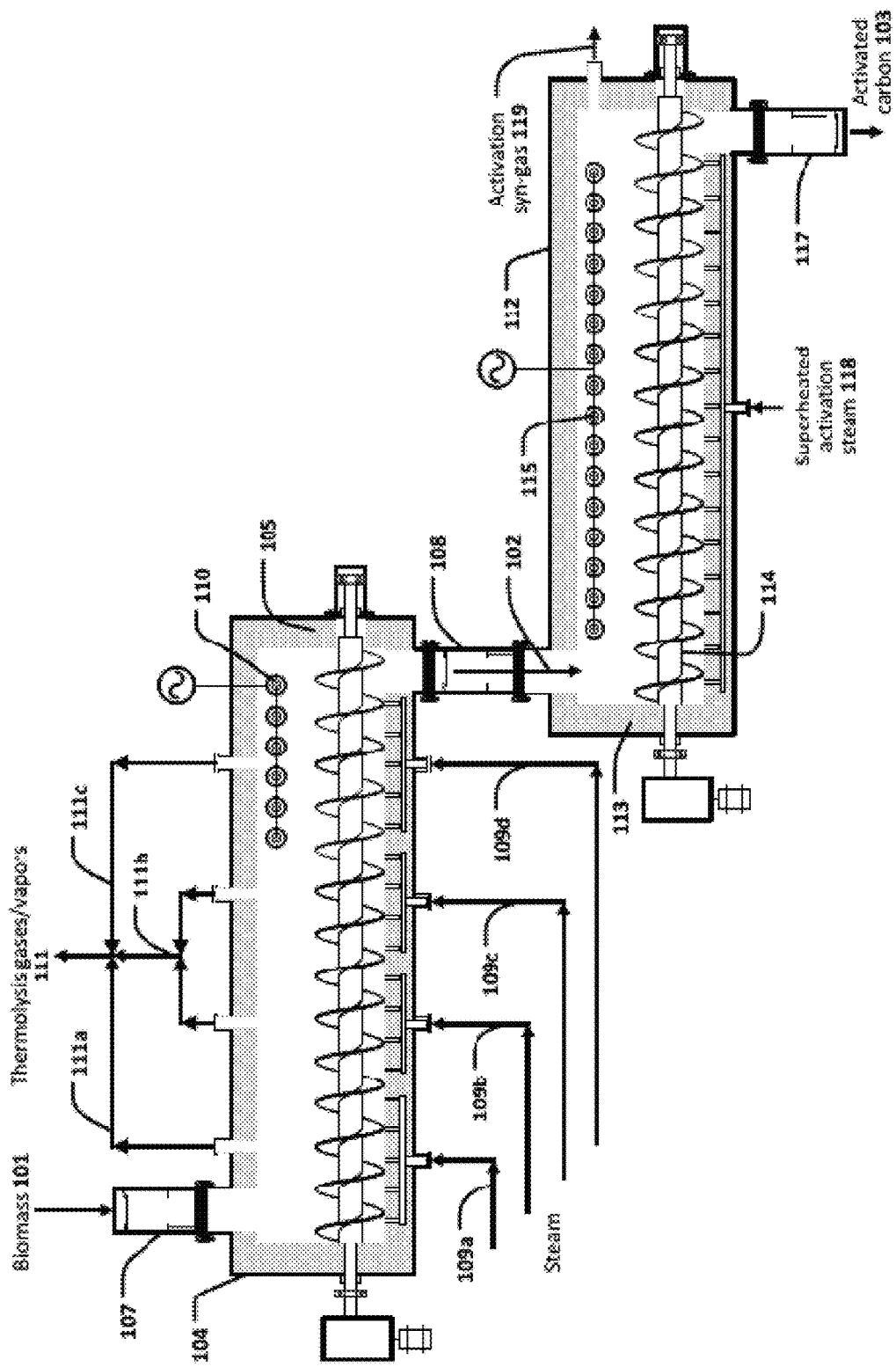
FIG. 1 is a schematic incorporating features of the system, apparatus, and method claimed in a preferred embodiment of the present invention.

Provided herein are apparatuses, systems, and methods useful for continuous thermolysis of carbonaceous matter.

In certain aspects and embodiments, the invention presents continuous thermolysis of carbonaceous matter in a controlled temperature and steam environment to produce a low volatility char, with subsequent steam activation of the char under pressure producing activated carbon and pressurized syn-gas, all of which are carried out in a reactor system including one or more vessels. The syn-gas is enriched in hydrogen in a high temperature shift reactor and separated in a pressurized swing adsorber to provide a pressurized pure hydrogen stream and a low-pressure combustible tail gas.

In certain aspects and embodiments, the tail gas and the volatiles from the thermolysis step are combusted to provide process steam and electric power. The electric power is used to supplement the thermal requirements of the process with the balance being exported. In certain aspects and embodiments, some or all of the volatiles from the thermolysis step are used to produce hydrogen.

Definitions

Unless defined otherwise, all technical and scientific terms used herein have the same meaning as is commonly understood by one of ordinary skill in the art. If there is a plurality of definitions for a term herein, the present specification, including those in this section, will control.

The terms "a," "an," and "the" as used herein may include aspects with one or more members.

The terms "comprise" and "comprising" as used herein may include embodiments with additional components. For example, an embodiment of a method "comprising steps A and C" may further include a step B or step D.

The term "or" as used herein should in general be constructed non-exclusively unless the alternatives presented cannot be combined without contradiction.

In the present application, reference is made to particular aspects, features, and embodiments of the invention, including method steps. In certain aspects of the information, the features of different aspects or embodiments may be combined, at least insofar as such can be combined without contradiction.

OBJECTS OF THE INVENTION

In certain aspects and embodiments of the present invention, the shortcomings of the prior art are resolved, in part by using steam as the process heat transfer medium.

Steam has almost twice the thermal capacity of the exhaust gases normally used to provide the requisite heat for pyrolysis and activation. Steam is also an excellent thermal radiator, while nitrogen, by contrast, which comprises about 70% of normal combustion gas, does not radiate heat at all. These particular properties cut the mass flow of heat transfer gases in half, but more particularly, when combined with pressurized operation, gas velocity is reduced by orders of magnitude. Low gas velocity, in conjunction with proper feedstock preparation for removal of fines and the fact that the ash remains commingled with the product activated carbon, essentially eliminates particulate carryover from the carbonization and activation gases, thus avoiding the expense of dust control which is required by both kiln and fluidized bed activation systems.

Figure 4:
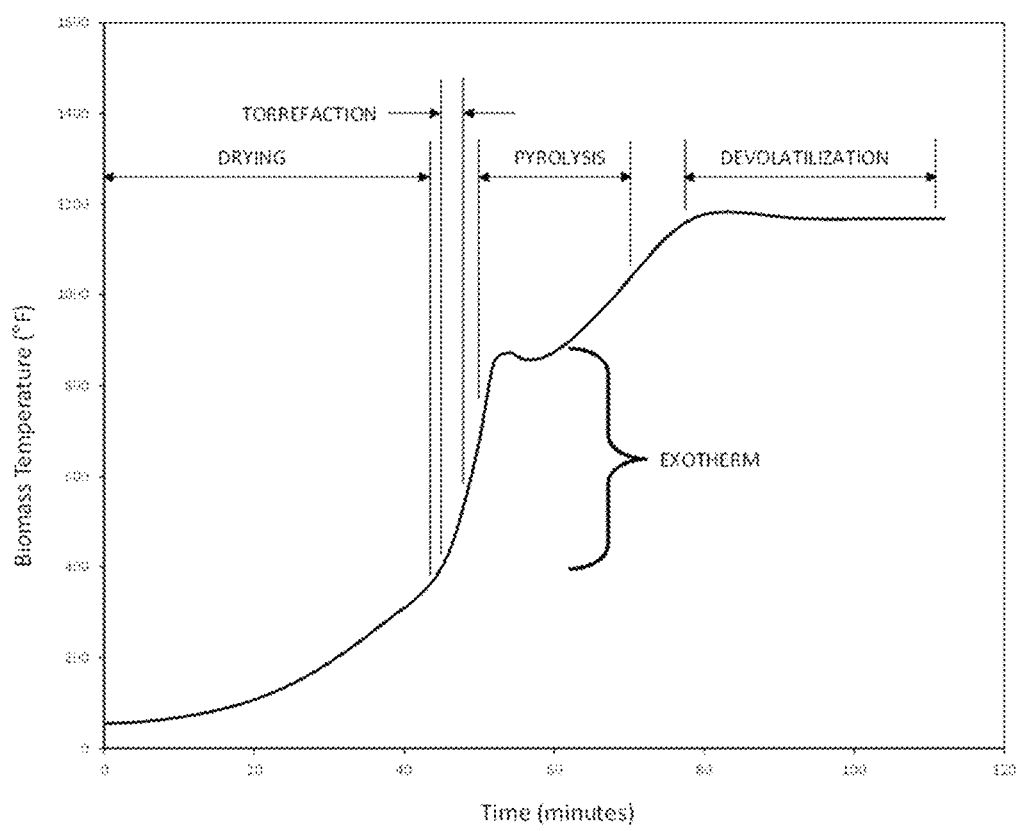
FIG. 4 illustrates the four stages of thermolysis (i.e., drying, torrefaction, pyrolysis, and devolatilization), shown for a biomass heating rate of 18° F. (10)° ° C. per minute up to the devolatilization stage.

A further advantage of the present invention is that the thermolysis process is deliberately divided into multiple temperature steps and ramps with sequential steps for drying at 275 to 350° F. (135 to ca. 177° C.), torrefaction at 375 to 600° F. (ca. 191 to 316° C.), pyrolysis at 750 to 1,050° F. (ca. 399 to 566° C.), and devolatilization at 1,300 to 1,350° F. (ca. 704 to 732° C.). FIG. 4 is an illustration of these four stages of thermolysis, shown for a biomass heating rate of 18° F. (10° C.) per minute up to the devolatilization stage.

At each of these steps, the benefits derived from the deliberate use of steam and temperature staging become apparent:

(1) Drying—in addition to thermal transfer, steam can be used to distill essential oils from certain biomass materials, which, when followed by condensation and separation of the resultant oil phase, can enhance the financial viability of the process.

(2) Torrefaction—as is illustrated in FIG. 4, biomass torrefaction is exothermic and steam is required to temper overheating while also acting as a reagent in the thermolysis of the cellulosic fractions of the carbonaceous feed. Biomass, in particular, is composed primarily of cellulose, hemicellulose, and lignin with various lesser components which depend on the biomass source. Both cellulosic components thermally rupture before lignin decomposes, but particularly so under the influence of steam and at lower temperatures, which then results in simpler chemical moieties, certain of which, such as levoglucosan, hydroxyacetaldehyde, and furfural, can be recovered as dictated by market value. In addition to the condensable fraction, permanent gases are also formed, with carbon dioxide being the major component at more than 70% which introduces the possibility of additional carbon capture. The balance of the gases comprises carbon monoxide (about 10%) with hydrogen and various hydrocarbons making up the remainder. Another benefit of the reactive nature of steam is that carbonization is almost complete by the end of torrefaction, at 575° F. (ca. 302° C.), in contrast with temperatures of over 900° F. (ca. 482° C.) required for a similar conversion without steam.

(3) Pyrolysis—steam continues to influence both the chemistry and temperature of this stage of thermolytic rupture to lower the molecular weight of the product spectrum and prevent further polymerization into refractory polycyclic hydrocarbons (tar) while completing the carbonization process at lower temperatures than conventional processing.

(4) Devolatilization—in this stage steam drives off the last of the volatiles and starts to open up the pores of the char. Additional heat is necessary to maintain the required temperature in this stage, and in the present invention, this is provided by radiation from electric radiant heating elements.

The overall results of thermolysis staging are to produce a slate of recoverable materials, reduce the energy needed for the process, simplify the capture of carbon from the torrefaction gases in the form of carbon dioxide, and provide a tar-free char that facilitates the production of hydrogen.

Of major import to the staging process is the incorporation of a screw reactor as the mechanism for the thermolysis of carbonaceous matter. While screw reactors have previously been used for pyrolysis, the process of staged pyrolysis, where the thermolysis process is separated into specific controlled temperature reaction zones, has not been taught. Other conventional pyrolysis/activation reactors are unsuitable for zonal separation. As examples, kilns exhibit the complication of a rotating shell, and fluidized beds are a totally mixed reactor. Screw reactors, as described in the invention, are axially separable into distinct controlled temperature zones, such that the overarching thermolysis reaction can be subdivided as described above. Even these stages can be further subdivided to maximize energy utilization and valuable product recovery. Each stage can have separate inputs of reactant, flow rate, residence time, and thermal energy with corresponding gaseous outputs for recovery of specific materials, thus providing for fractional distillation and fractional condensation. Besides screw reactors, traveling grates with mixing plows can also be employed with similar results.

A still further advantage of the present invention is the incorporation of radiant electric heating elements, encapsulated inside temperature and pressure-resistant protective tubes and mounted substantially above the screw mechanism in the devolatilization section of the thermolysis reactor and in the activation reactor, thus preventing damage to the heaters and facilitating on-line replacement of defective heating elements. Electric radiant heating eliminates the need for large volumes of combustion exhaust gas, which would otherwise be necessary to provide the significant endothermic reaction heat of activation, 131.3 KJ/mol, with the concomitant problem of product entrainment and gas clean-up. Furthermore, operation of the activation reactor with electric radiant heat produces a synthesis gas free of diluent nitrogen and carbon dioxide, but more importantly avoids the potential for product loss due to excess oxygen, almost always present in the combustion gas. Only with electric radiant heat does it become viable to recover hydrogen, otherwise the financial requirements to cool, compress and re-cool large volumes of combustion gas, followed by the separation of hydrogen from such a diluted gas, become prohibitive.

Joule heating of biomass by passage of electric current has been taught, but its effectiveness is limited by inconsistent current flow created by the heterogeneous nature of biomass. The method taught in the present invention, by contrast, employs predictable and controlled radiative heat. An added benefit of radiative heat is that it is very much more efficient than convective heat which is the dominant mode of heat transfer for hot exhaust gas. Correspondingly, the radiative surface (protective tube for the electric heating element) is not required to be much hotter than the char surface, which increases the range of materials suitable for the tube's fabrication.

In certain embodiments of the method claimed in the present invention, there is sufficient process heat available from the activation and shift reactors to provide the steam requirements of both the activation and shift reactors as well as the power for the boiler feedwater pumps.

An advantage of operating the activation reactor pressurized with steam as claimed in the present invention is that synthesis gas is produced at a suitable pressure for separation and purification of hydrogen. Pressurizing boiler feedwater to 150 to 1000 psig takes 40 times less power than would be required to compress synthesis gas from atmospheric to similar pressures. Another benefit of operating at such steam pressures is that equivalent activation can occur at lower temperatures.

A still further advantage of the use of pressurized steam as a heat transfer medium and carrier gas is that, if the thermolysis gases are used for powering a combined cycle gas turbine, the steam used to promote heat transfer acts as a remote source of steam injection and thus increases the power output of the turbine (e.g., by more than 20%).

It is an object of the present invention to maximize the yield of high-quality activated carbon and hydrogen while optimizing steam and power production and minimizing capital and operating costs.

It is another object of the present invention to minimize the impact on the environment by making maximum use of all available energy entering the process to produce high purity, commercial-grade renewable-source hydrogen and renewable-source electricity suitable for interconnection to the power grid while sequestering carbon and ash in the activated carbon product, and by capturing pure carbon dioxide for use or sequestration.

It is yet another object of the invention to provide flexibility in the operation of the thermolysis process to recover a variety of selected chemicals as dictated by market opportunities.

It is a still further object of the present invention to operate the thermolysis and activation zones of the apparatus at separable pressures to optimize the overall output of the downstream power equipment.

It is still another object of the present invention to provide separation of the thermolysis and activation gases concurrently while allowing continuous conveyance of char by installing geometric restrictions at the zonal interface.

One advantage of making hydrogen from the volatile materials from different sections of the screw pyrolyser is that it is possible to use different operating conditions, such as a different temperature, catalyst, or the like, to vapors coming from different sections of the screw pyrolyser. For example, as the woody materials are conveyed along the length of the screw they are subjected to different temperatures. At the lowest temperature, the vapor consists primarily of water, which can be condensed or otherwise treated and not used for making hydrogen. As the material processes along the screw and is exposed to higher temperatures (e.g., about 300)° ° C., more water along with carbon dioxide is emitted with smaller amounts of other materials. This carbon dioxide can be separated out and sold or sequestered and the water condensed. The balance can be reformed to hydrogen if appropriate. In the next stage of vapor release, simple organic molecules are produced, which can be easily reformed into hydrogen. Towards the end of the reactor, much larger, complex polyaromatic compounds (i.e., tars) such as naphthalene, anthracene, or other polycyclic aromatic compounds, are emitted. Because these are much harder to reform into hydrogen and require more severe conditions (e.g., higher temperatures, etc.), they can be reformed under those conditions or combusted (e.g., by sending them to the boiler). Using severe conditions for a fraction of the gas saves equipment cost and energy over treating all the vapors. In conventional processes for reforming of the volatiles into hydrogen, there is no separation of the streams and all of the vapors are treated (reformed) into hydrogen. This, in turn, means that all the vapors have to be exposed to the most severe reforming conditions, even materials like carbon dioxide which cannot be so converted. Treating the total volume of vapors results in rapid degradation of the reforming catalyst due to carbon buildup on the catalyst. This, in turn, allows any tars to pass through untreated, which can build up, block equipment, and even cause fires in downstream equipment.

These and other objects and advantages are realized through the techniques of the present invention. Other embodiments and aspects of the invention are described in detail herein and are considered a part of the claimed invention.

The recitation herein of desirable objects which are met by various embodiments of the present invention is not meant to imply or suggest that any or all of these objects are present as essential features, either individually or collectively, in the most general embodiment of the present invention or in any of its more specific embodiments.

Selected Embodiments of the Invention

In certain embodiments, the present invention is directed to a system for continuous, concurrent production of activated carbon, process steam, and electric power from carbonaceous matter, comprising:

a thermolysis reactor, wherein carbonaceous matter is processed in individually temperature-controlled zones for sequentially drying, torrefying, pyrolysing, and devolatilizing the carbonaceous matter to produce char and volatile materials, the thermolysis reactor comprising;

a carbonaceous matter inlet, a char outlet, means for moving the carbonaceous matter from the carbonaceous matter inlet to the char outlet, means for admitting steam at one or more locations within the zones for sequentially drying, torrefying, pyrolysing, and devolatilizing the carbonaceous matter, a radiant electric heat distribution system acting to control the temperature within the devolatilization zone, and an array of volatile materials outlets; and a pressurized activation reactor, wherein the pressurized activation reactor comprises:

a char inlet, an activated carbon outlet, means for moving char from the char inlet to the activated carbon outlet, means for admitting steam into the pressurized activation reactor, a second radiant electric heat source, and a pressurized synthesis gas outlet. In certain embodiments, the system for continuous, concurrent production of activated carbon, hydrogen, process steam, and electric power from carbonaceous matter further includes:

a power island, the power island providing power to the radiant electric heat distribution system, the power island further providing steam to the thermolysis reactor and the pressurized activation reactor.

In certain embodiments, the invention provides a system for continuous, concurrent production of activated carbon, hydrogen, process steam, and electric power from carbonaceous matter, including:

a thermolysis reactor and a pressurized activation reactor, wherein the thermolysis reactor comprises:
  a carbonaceous matter inlet,
  a char outlet,
  means for moving carbonaceous matter from the carbonaceous matter inlet to the char outlet,
  zones for sequentially drying, torrefying, pyrolysing, and devolatilizing carbonaceous matter to produce char and volatile materials,
  means for admitting steam into the thermolysis reactor,
  a first radiant electric heat source within the zone for devolatilizing, and
  one or more volatile materials outlets; and
wherein the pressurized activation reactor comprises:
  a char inlet,
  an activated carbon outlet,
  means for moving char from the char inlet to the activated carbon outlet,
  means for admitting steam into the pressurized activation reactor,
  a second radiant electric heat source, and
  a pressurized synthesis gas outlet;
means for minimizing the intermixing of gases from the thermolysis reactor and the pressurized activation reactor while allowing passage of the char from the thermolysis reactor to the pressurized activation reactor;
means for minimizing the ingress and egress of gases through the carbonaceous matter inlet and the activated carbon outlet;
a power island, the power island providing power to the first and second radiant electric heat sources, the power island further providing steam to the thermolysis reactor and the pressurized activation reactor.

In certain embodiments, the system for continuous, concurrent production of activated carbon, hydrogen, process steam, and electric power from carbonaceous matter further includes:

a hydrogen purification system producing purified hydrogen, and combustible tail gas from the cooled and dehumidified pressurized synthesis gas; and means for compression and storage of the purified hydrogen.

In certain embodiments, the system further includes a shift reactor.

In certain embodiments, the system further includes a power island fueled by tail gas discharged from the hydrogen purification system.

In certain embodiments, the invention provides a system for continuous, concurrent production of activated carbon, hydrogen, process steam, and electric power from carbonaceous matter, including:

a thermolysis reactor, wherein carbonaceous matter is processed in individually temperature-controlled zones for sequentially drying, torrefying, pyrolysing, and devolatilizing the carbonaceous matter to produce char and volatile materials, the thermolysis reactor comprising;
  a carbonaceous matter inlet,
  a char outlet,
  means for moving the carbonaceous matter from the carbonaceous matter inlet to the char outlet,
  means for admitting steam at one or more locations within the zones for sequentially drying, torrefying, pyrolysing, and devolatilizing the carbonaceous matter, the steam acting variously to facilitate chemical reactions, to sweep volatile materials out of the thermolysis reactor and to provide controlled thermal energy,
  a radiant electric heat distribution system acting to control the temperature within the devolatilization zone, and
  an array of volatile materials outlets,
wherein the thermolysis reactor is conjoined with a pressurized activation reactor,
the pressurized activation reactor, wherein the char is reacted with pressurized steam to produce activated carbon and pressurized synthesis gas, the pressurized activation reactor comprising:
  a char inlet,
  an activated carbon outlet,
  means for moving the char from the char inlet to the activated carbon outlet,
  means for admitting steam, the steam acting as a reactant for char activation,
  a radiant electric heat distribution system acting to provide endothermic heat of reaction, and a pressurized synthesis gas outlet;
separation means at the junction of the thermolysis reactor and the pressurized activation reactor acting to effectively isolate the interior environment of the thermolysis reactor from the interior environment of the pressurized activation reactor while allowing passage of the char from the thermolysis reactor into the pressurized activation reactor;
means for admitting carbonaceous feed into the thermolysis reactor and for discharging activated carbon from the pressurized activation reactor while maintaining the various working pressures therein and minimizing the ingress of air and egress of gases and vapors to atmosphere;
means for recovering heat from the pressurized synthesis gas by generating steam while cooling and dehumidifying the pressurized synthesis gas and producing cooled and dehumidified pressurized synthesis gas;
a hydrogen purification system producing purified hydrogen, and combustible tail gas, from the cooled and dehumidified pressurized synthesis gas;
means for compression and storage of the purified hydrogen;
a power island comprising means for combustion, process steam raising, heat exchange, and electric power generation, fueled by the volatile materials discharged from the thermolysis reactor and the tail gas discharged from the hydrogen purification system;
means for delivering electric power from the power island to the radiant electric heat distribution systems of the thermolysis reactor and the pressurized activation reactor; and
means for delivering steam from the power island to the thermolysis reactor and steam from the means for recovering heat from the pressurized synthesis gas to the pressurized activation reactor.

In certain aspects and embodiments, the means for moving the carbonaceous matter from the carbonaceous matter inlet to the char output can include a screw (e.g., FIG. 1 at 106). In certain embodiments, the screw may be configured as a single screw with cut flights, a single screw with mixing paddles, a shaftless screw, multiple screws, multiple identical screws, screws with flights having pitches differing along the shaft length, and screws with shaft diameter differing along the shaft length, driven by a variable speed drive and optionally cooled (or heated) by passage of a heat transfer fluid through the shaft. In certain embodiments, the screw (e.g., 106) may instead be configured as a traveling grate with mixing plows.

In certain embodiments, the means for moving the carbonaceous matter from the carbonaceous matter inlet to the char outlet can include a multi-stage reactor, such as a reactor configured with multiple fluidized beds, multiple moving beds, or a modified continuous ablative reactor (CAR). In certain embodiments, the means for moving the carbonaceous matter from the carbonaceous matter inlet to the char outlet can include a compression screw feeder (e.g., a co-ax feeder). In certain embodiments, the means for moving the carbonaceous matter from the carbonaceous matter inlet to the char outlet can include multiple screws in series. In certain embodiments, the means for moving the carbonaceous matter from the carbonaceous matter inlet to the char outlet can include a variable refractory contour to assist in separating zones or combinations. In certain embodiments, the means for moving the carbonaceous matter from the carbonaceous matter inlet to the char outlet can include a drag chain conveyor or tray conveyor.

In certain aspects and embodiments, the means for admitting steam at one or more locations within the zones for sequentially drying, torrefying, pyrolysing, and devolatilizing the carbonaceous matter can include apertures, e.g., apertures located beneath the longitudinal conveyance apparatus (i.e., for the activation reactor, such as steam flows 109a, 109b, 109c, and 109d in FIG. 1). In certain embodiments, the activation reactor 112 is designed similarly to the thermolysis reactor.

In certain embodiments, the means for admitting steam at one or more locations within the zones for sequentially drying, torrefying, pyrolysing, and devolatilizing the carbonaceous matter can include one or more nozzles or spargers. In certain embodiments, the means for admitting steam can include piping fitted with control means, such as one or more manual or automatic valves or simple orifices. In certain embodiments, nozzles mounted on the bottom of the screw are designed to minimize back fill with biomass solids and are level with or just below refractory level. In certain embodiments, steam can be injected through the screw (e.g., the screw shaft or flights). In certain embodiments, the steam can be mixed with recirculated gas (e.g., carbon dioxide or recirculated tail gas).

In certain aspects and embodiments, the means for moving the char from the char inlet to the activated carbon outlet can include a collinear longitudinal conveyance mechanism. In certain aspects and embodiments, the means may be a screw, which may be configured as a single screw (e.g., FIG. 1 at 114). For example, screw 114 gently mixes and transports the char 102 across the bottom of the reactor as it undergoes activation.

In certain embodiments, the means for moving the char from the char inlet to the activated carbon outlet may be configured as a single screw with cut flights, a single screw with mixing paddles, a shaftless screw, multiple identical screws, screws with flights having pitches differing along the shaft length, and screws with shaft diameter differing along the shaft length, driven by a variable-speed drive and optionally cooled (or heated) by passage of a heat transfer fluid through the shaft. In certain embodiments, the screw may instead be configured as a traveling grate with mixing plows.

In certain embodiments, the means for moving the char from the carbonaceous matter inlet to the char inlet can include a multi-stage reactor, such as a reactor configured with multiple fluidized beds, multiple moving beds, or a modified CAR reactor. In certain embodiments, the means for moving the carbonaceous matter from the carbonaceous matter inlet to the char outlet can include a compression screw feeder (e.g., a co-ax feeder). In certain embodiments, the means for moving the carbonaceous matter from the carbonaceous matter inlet to the char outlet can include multiple screws in series or in parallel. In certain embodiments, the means for moving the carbonaceous matter from the carbonaceous matter inlet to the char outlet can include a variable refractory contour to assist in separating zones or combinations. In certain embodiments, the means for moving the carbonaceous matter from the carbonaceous matter inlet to the char outlet can include a drag chain conveyor or tray conveyor.

In certain aspects and embodiments, the means for admitting steam, the steam acting as a reactant for char activation, can include apertures located beneath the longitudinal conveyance apparatus. In certain embodiments, the means for admitting steam can include one or more nozzles or spargers. In certain embodiments, the means for admitting steam can include piping fitted with control means, such as one or more manual or automatic valves or simple restriction orifices. In certain embodiments, nozzles mounted on the bottom of the screw are designed to minimize back fill with biomass solids and are level with or just below refractory level. In certain embodiments, steam can be injected through the screw (e.g., the screw shaft or flights). In certain embodiments, the steam can be mixed with recirculated gas (e.g., carbon dioxide or recirculated tail gas).

In certain aspects and embodiments, the steam could be combined with another source of gas to control the steam activation rate. In certain embodiments, the other source of gas is the thermolysis gas 111b or tail gas from 209 or 305. In certain embodiments, this could be followed by catalytic reforming, which would also reform some of the methane in the activation syngas, thus improving hydrogen yield.

In certain aspects and embodiments, the separation means at the junction of the thermolysis reactor and the pressurized activation reactor is configured as a partial restriction located at the juncture of the thermal steam environments to minimize intermixing of the thermolysis product gases with the activation synthesis gas. In certain aspects and embodiments, the separation means effectively isolates the interior environment of the thermolysis reactor from the interior environment of the pressurized activation reactor while allowing passage of the char from the thermolysis reactor into the pressurized activation reactor.

In certain embodiments, the separation means may be a partial restriction in cross section, supplemented by a decrease in pitch length of the screw, which can minimize the interchange of thermolysis products with synthesis gas. In certain embodiments (e.g., a single screw for both thermolysis and activation), restriction could be reshaping of the refractory to minimize flow area and controlling flow from the zone (e.g., by automatic valves, e.g., so that the rate of vapor production in the zone matches the rate of removal from the zone).

In certain aspects and embodiments, if operating at a single pressure, the separation means may be drop chutes between the vessels. In certain aspects and embodiments, if operating at two or more distinctly different pressures or if using separate screws for thermolysis and activation, the separation means may be lock hoppers (e.g., 108) or similar devices isolating the pressure transitions. Other separation means that isolate the interior of the vessel from the external atmosphere of the vessel may be used, such as rotary valves, piston feeders, or plug-forming feeders. In embodiments for which the separation means is the primary pressure seal for the inlet of the second vessel (e.g., activation reactor 112), they preferably are of severe duty design.

In certain aspects and embodiments, the means for admitting carbonaceous feed into the thermolysis reactor and for discharging activated carbon is configured as a lock hopper (e.g., 107 and 117). In certain aspects and embodiments, the means allows admission from the pressurized activation reactor while maintaining the various working pressures therein and minimizing the ingress of air and egress of gases and vapors to atmosphere. In certain embodiments, the means for admitting carbonaceous feed may be configured as other commercially available feeder equipment that isolates the interior of the vessel from the exterior atmosphere of the vessel, such as rotary valves, piston feeders, or plug-forming feeders.

In certain embodiments, the means for admitting carbonaceous feed is a pump. The biomass is combined with liquid (e.g., pyrolysis oil or condensed bio-oil) and pumped as a mixture (e.g., a slurry).

In certain aspects and embodiments, the means for recovering heat from the pressurized synthesis gas is a steam superheater. For example, in certain embodiments, heat is recovered from tail gas combustor exhaust 215 in steam superheater 216, high pressure steam superheater 217, and heat recovery steam generator 218 in series. In certain embodiments, the means generates steam while cooling and dehumidifying the pressurized synthesis gas, thus producing cooled and dehumidified pressurized synthesis gas.

In certain embodiments, the tail gas or even the thermolysis gas 111 is heated before combustion, thus increasing the power output from the gas turbine or power boiler. In certain embodiments, some synthesis catalyst is mixed (and recovered) in the activation reactor to recover some of the synthesis reaction heat. In certain embodiment, the catalyst is blended in the thermolysis reactor to assist in reforming the thermolysis gases, as the vapors have a tendency to become more difficult to reform while they are hot (and more difficult the longer that they remain hot). In certain embodiments, preheated steel or ceramic balls are added to the thermolysis reactor to reduce the amount of steam required.

Figure 2:
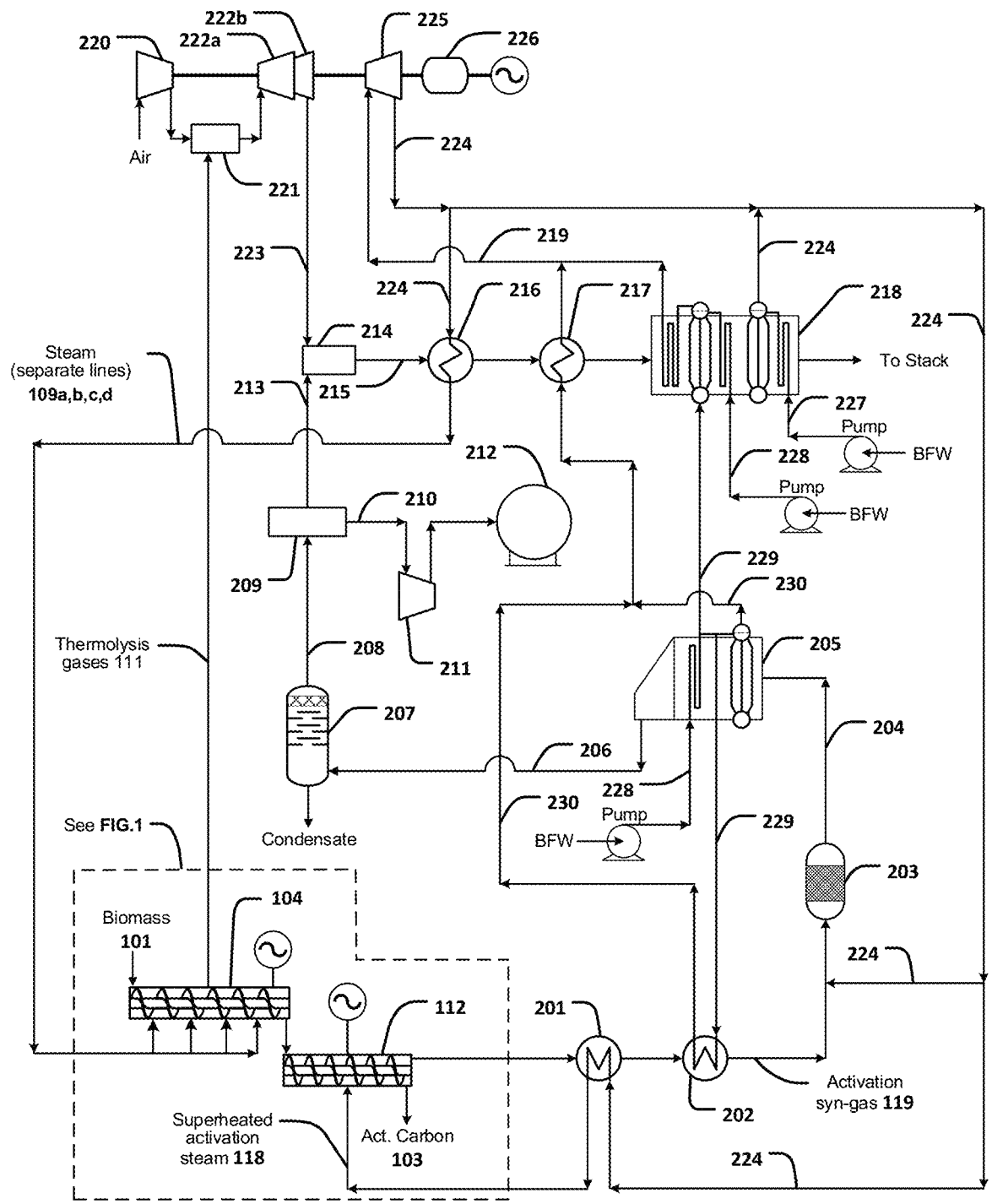
FIGS. 2 and 3 schematically depict examples of the inventive system incorporating various components and processes for energy recovery, electric power generation, and hydrogen gas recovery to comprise a complete system.

In certain aspects and embodiments, the means for compression and storage of the purified hydrogen is configured as a hydrogen compressor (e.g., 211 or 308). For an example as shown in FIG. 2, hydrogen 210 is separated from cooled dry syn-gas 208 in pressurized swing adsorbers 209 at a pressure not materially less than the operating pressure in activation reactor 112. The hydrogen is further compressed by compressor 211, and it can be stored in any form used by the skilled artisan, e.g., in pressure vessel(s) 212 as a product for sale.

In certain aspects and embodiments of the system as otherwise described herein, the thermolysis gases/vapors are used as the source of heat required by the catalytic reformer.

In certain aspects and embodiments of the system as otherwise described herein, the volatile vapors from the steam thermolysis of carbonaceous materials in the thermolysis reactor are partitioned into three or more vapor streams (e.g., three, four, five, or six vapor streams).

In certain aspects and embodiments, the invention provides a method for continuous, concurrent production of activated carbon, hydrogen, process steam, and electric power from carbonaceous matter, comprising sequentially drying, torrefying, pyrolysing, and devolatilizing the carbonaceous matter in a series of temperatures zones of a thermolysis reactor by admitting steam to the zones. Preferably, the steam inlet(s) and outlet(s) are configured to maintain temperatures appropriate for a zone's process.

In certain aspects and embodiments, the method as otherwise disclosed herein is followed by activating the resulting char in an activation reactor by admitting steam, the steam acting to facilitate the formation of pores in the char, wherein a radiant heat distribution system controls the temperature within the activation reactor, an outlet permits release of reaction product gases, and a separate outlet permits discharge of activated carbon product.

In certain embodiments, the method as otherwise disclosed herein further comprises activation of devolatilized carbonaceous material with steam in a second reactor.

In certain embodiments, a radiant electric heat distribution system controls the temperature within the devolatilization zone. In certain embodiments, an array of outlets permits selective release and separation of volatile materials.

In certain embodiments, the method as otherwise disclosed herein comprises the use of a system as otherwise described herein.

Exemplary Embodiments

In certain aspects and embodiments, the present invention relates to a method, apparatus, or system for converting carbonaceous matter to activated carbon, hydrogen, electrical power, and optionally valuable chemicals derived from lignocellulosic feedstocks, in contained and controlled thermal steam environments, and constitutes or comprises:

(1) A first elongated vessel (thermolysis reactor), optionally operated under pressure and partially electrically heated, acting to continuously dry, torrefy, pyrolyse, and devolatilize carbonaceous matter to low-volatility char while releasing various gases and vapors, the more valuable of which may be recovered with the balance being combusted to recover energy and steam;

(2) A second elongated vessel (activation reactor), operated under pressure and electrically heated, acting to continuously steam activate the resulting char, producing marketable activated carbon while releasing synthesis gas for further processing first by shift conversion means to increase hydrogen content and subsequently by separation and purification of hydrogen under pressure while recovering energy and steam by combusting the tail gas discharged from the hydrogen separator; and (3) Heat exchangers and a power plant producing the steam and electricity required for the process.

With reference to FIG. 1, according to an embodiment of the invention, biomass, of a maximum average dimension of less than 2 inches, and preferably derived from agricultural and forest sources selected for suitability in producing commercial quality activated carbon, such as chipped, hogged, or pelletized orchard removal wood, nut shells, stone fruit and olive pits, and forest removal wood, is dried if necessary to preferably less than 15%, and more preferably less than 7% moisture content, thus constituting dried biomass 101. Drying processes in common use are employed and are not shown. The dried biomass 101 is fed at a controlled rate through lock hopper 107 into a first elongated vessel 104 (thermolysis reactor) lined internally with refractory thermal insulation and abrasion resistant hot face refractory 105. Thermolysis reactor 104 is operated at a pressure ranging from near atmospheric to 1,000 psig, dictated by the requirements of the power plant selected (steam boiler Rankine cycle or gas turbine/combined cycle respectively). Besides lock hoppers, other commercially available feeder equipment which isolate the interior of the vessel from the exterior atmosphere of the vessel, such as rotary valves, piston feeders, and plug-forming feeders, may also be used.

Screw 106 gently mixes and transports the dried biomass 101 across the bottom of the first vessel 104. The screw 106 may be configured as a single screw with cut flights, a single screw with mixing paddles, a shaftless screw, multiple identical screws, screws with flights having pitches differing along the shaft length, and screws with shaft diameter differing along the shaft length, driven by a variable speed drive and optionally cooled by passage of a heat transfer fluid through the shaft. The screw 106 may instead be configured as a traveling grate with mixing plows.

Thermal processing occurs in four stages, as identified above, with optionally superheated steam flows 109a, 109b, 109c, and 109d injected into the vessel independently along the bottom acting to completely dry, torrefy, pyrolyse, and devolatilise the biomass in sequence while raising its temperature in stages to 1,300 to 1,350° F. (ca. 704 to 732° C.) with the steam moving upwards through the biomass and driving off water and the volatile organic compounds before they polymerize into higher molecular weight compounds. The steam, optionally superheated, (e.g., 109a) introduced into the drying zone, acts to raise the temperature of the dried biomass to a range of 275 to 350° F. (135 to ca. 177° C.) while sweeping out the moisture in the biomass along with distilled oils. The steam 109b introduced into the torrefaction zone acts to moderate the rapid temperature rise in this stage and to maintain the temperature within the limits of the torrefaction process, 375 to 600° F. (ca. 191 to 316° C.). The controlled flow of superheated steam 109c is introduced into the pyrolysis zone at a temperature sufficient to ramp and hold the temperature at the pyrolysis conditions of 750 to 1,050° F. (ca. 399 to 566° C.) and acts to sweep out pyrolysis products. The exothermic reactions are rapid once initiated, and the residence time of biomass undergoing thermolysis can be as short as 10 minutes depending on feedstock moisture and particle size. The high temperature superheated steam 109d introduced into the devolatilization zone at a relatively low flow rate acts to sweep out the remaining volatiles while the char temperature rises to between 1,300 and 1,350° F. (ca. 704 to 732° C.). In the final section of thermolysis reactor 104, the temperature is controlled by radiant electric heaters 110 disposed in the vapor space of the vessel substantially above the screw mechanism. The radiant electric heating elements can be placed within temperature and pressure resistant protection tubes transverse to the longitudinal axis of the vessel, so they are individually replaceable on line. The steam acts to minimize production of higher molecular weight polyaromatic compounds such as tars, leaving the finished char 102 containing Dry Ash Free (DAF) matter greater than 80%, and preferably greater than 95%, and containing essentially all the ash present in the feedstock 101.

The hot thermolysis gases and vapors 111 (i.e., all or part(s) of 111a, 111b, and 111c), along with the steam, are discharged from the thermolysis reactor at one or more discharge ports as dictated by the requirements for chemicals recovery. If the thermolysis reactor is operated at a pressure in the range 150 to 600 psig (e.g., about 150, 160, 170, 180, 190, 200, 225, 250, 275, 300, 325, 350, 375, 400, 425, 450, 475, 500, 525, 550, 575, or 600), the hot thermolysis gases and vapors 111 are suitable for powering a gas turbine without further compression, as shown in FIG. 2, thus saving considerable energy and capital cost. Hot thermolysis gases and vapors at near atmospheric pressure are suitable for firing a boiler as described in FIG. 3. The resulting char 102 drops into lock hopper 108. Since the ash contained in the biomass feedstock 101 remains in the char and the velocity of the steam sweeping out the pyrolysis products is low, the thermolysis gases and vapors 111 are essentially free of particulate matter although their composition will vary based on the nature of the biomass feedstock.

In the embodiment shown in FIG. 1 with both vessels operating at the same pressure, lock hopper 108 from the first vessel 104 (thermolysis reactor) to the inlet of the second vessel 112 (activation reactor) can be of light duty design. However, if the first vessel is operating at 2 psig or less, inlet lock hopper 107 can be of light duty design while lock hopper 108 becomes the primary pressure seal for the inlet of the second vessel 112 (activation reactor) and should be of severe duty design. In other embodiments, the thermolysis reactor may be operated at near atmospheric pressure, at a pressure equal to that in the activation reactor, or at various other pressures.

In another embodiment, the char 102 is cooled and packaged for sale, and there is no activation reactor.

The activation reactor 112 is designed similarly to the thermolysis reactor. It is an elongated vessel of circular cross section, lined internally with refractory thermal insulation and abrasion resistant hot face refractory 113, and may be operated at pressures ranging from 150 to 1000 psig (e.g., about 150, 200, 250, 300, 350, 400, 450, 500, 550, 600, 650, 700, 750, 800, 850, 900, 950, or 1000), but preferably in the range of 300-600 psig (e.g., about 300, 325, 350, 375, 400, 425, 450, 475, 500, 525, 550, 575, or 600), to facilitate separation of hydrogen under pressure. Screw 114 gently mixes and transports the char 102 across the bottom of the reactor as it undergoes activation. The screw 114 may be configured as a single screw with cut flights, a single screw with mixing paddles, a shaftless screw, multiple identical screws, screws with flights having pitches differing along the shaft length, and screws with shaft diameter differing along the shaft length, driven by a variable speed drive and optionally cooled by passage of a heat transfer fluid through the shaft. The screw 114 may instead be configured as a traveling grate with mixing plows.

To develop the necessary pore structure for a commercial grade activated carbon, the rate of oxidation is deliberately controlled by the flow of steam and the operating temperature such that the time for activation exceeds 30 minutes and preferably more than 45 minutes. The activation process is endothermic with the necessary reaction heat being provided by electric radiant heating elements 115. The radiant electric heating elements are placed within temperature and pressure resistant protection tubes transverse to the longitudinal axis of the vessel and mounted within the vapor space substantially above screw 114, so they are individually replaceable on-line. Superheated activation steam 118 is injected along the bottom, moving upwards through the char undergoing activation. The output of the radiant electric heating elements is controlled to maintain the temperature in the range of preferably 1,400 to 1,800° F. (ca. 760 to 982)° ° C., and more preferably 1,500 to 1,700° F. (ca. 816 to 927)° ° C. The superheated activation steam reacts with the char, forming micro pores and releasing hot pressurized activation syn-gas 119 composed mostly of hydrogen and carbon monoxide while the char becomes activated. Producing syn-gas at a pressure greater than 150 psig avoids a very expensive and energy intensive compression step otherwise required prior to separation of hydrogen by pressure swing adsorption. The activated carbon product 103 is discharged through lock hopper 117, cooled, and packaged for sale. The activation process is controlled to produce activated carbon with an Iodine Number of preferably greater than 600 and more preferably greater than 800. Since the activated carbon contains all of the ash originally present in the biomass feedstock and the velocity of the steam sweeping out the syn-gas is low, the activation syn-gas 119 is essentially free of particulate matter.

In the embodiment shown on FIG. 1, the activation reactor 112 produces activated carbon from the char 102 discharged from the thermolysis reactor 104. In another embodiment, activation reactor 112 produces activated carbon and hydrogen from imported pyrolyzed solid carbonaceous matter, such as char from biomass, char from peat and lignite, spent activated carbon, or coke. In this activation-only embodiment, the sensible heat in the hot pressurized activation syngas 119 is sufficient to generate and superheat the activation steam 118.

In another embodiment, the thermolysis reactor and activation reactor are disposed as a single reactor operated at a single operating pressure, preferably in the range of 150 to 600 psig (e.g., about 150, 160, 170, 180, 190, 200, 225, 250, 275, 300, 325, 350, 375, 400, 425, 450, 475, 500, 525, 550, 575, or 600). In this embodiment, thermolysis occurs in the section nearest the inlet and activation in the section nearest the outlet. At the interface between the devolatilization zone of the thermolysis section and the activation section, a partial restriction in cross section, optionally supplemented by a decrease in pitch length of the screw, minimizes the interchange of thermolysis products with synthesis gas.

In certain embodiments, either or both of the thermolysis and activation reactors are disposed as multiple interconnected vessels in series, each disposed at an angle of up to 25 degrees above horizontal (e.g., about 1, 2, 3, 4, 5, 6, 7, 8, 9, 10, 11, 12, 13, 14, 15, 16, 17, 18, 19, 20, 21, 22, 23, 24, or 25 degrees above horizontal) to facilitate placement side by side, with an inlet end in the first vessel, discharge and inlet ends of intermediate vessels conjoined, and a discharge end from the last vessel.

In certain embodiments, either or both of the thermolysis and activation reactors are disposed as multiple interconnected vessels in parallel in the same plane. In certain embodiments, the discharge and inlet ends of vessels are conjoined.

In certain embodiments, a portion of the char produced in the thermolysis reactor is diverted for further processing or sale and the remainder is introduced into the activation reactor.

FIG. 2 depicts schematically one of several possible configurations of equipment items constituting a complete system realizing all of the objects and advantages of the present invention, notably employing a combined cycle gas turbine generator for maximum recovery of energy from the volatile products released from the biomass and char being processed. (FIG. 2 includes a smaller scale rendition of FIG. 1 for reference.)

In this embodiment, thermolysis reactor 104 is operated at above atmospheric pressure, preferably in the range of 150 to 1000 psig (e.g., about 150, 200, 250, 300, 350, 400, 450, 500, 550, 600, 650, 700, 750, 800, 850, 900, 950, or 1000), more preferably 250 to 600 psig (e.g., about 250, 275, 300, 325, 350, 375, 400, 425, 450, 475, 500, 525, 550, 575, or 600), at a pressure suitable for a gas turbine combustor without requiring further compression of the fuel gas. As the dried biomass 101 is thermolysed to high-carbon char, hot pressurized thermolysis gases and vapors 111 are directed to gas turbine combustor 221 where compressed air from air compressor 220 provides combustion air. The steam carried out of the thermolysis reactor 104 lowers the combustor flame temperature, effectively reducing the power requirement for air compression and improving the gas turbine efficiency, e.g., by up to 20%. The combustion products power the gas turbine set 222a and 222b. Gas producer turbine expander 222a powers air compressor 220, and power producer turbine expander 222b is connected to the electric generator 226. Turbine exhaust 223 from gas turbine set 222a and 222b still contains sufficient oxygen to support further combustion and is used as the oxidizing gas in tail gas combustor 214 to combust the low-pressure tail gas 213 from pressurized swing adsorbers 209. Heat is recovered from tail gas combustor exhaust 215 in steam superheater 216, high pressure steam superheater 217, and heat recovery steam generator 218 in series. The cooled tail gas combustor exhaust is treated as required by air pollution regulations and discharged to atmosphere. Back pressure steam turbine 225 is on a common shaft with power producer gas turbine expander 222b and electric generator 226. Back pressure steam turbine 225 is powered by high pressure superheated steam 219 generated in the upstream section of heat recovery steam generator 218, supplemented by saturated high-pressure steam 230 heated by high pressure steam superheater 217. A portion of the medium pressure exhaust steam 224 from back pressure steam turbine 225 is reheated to various temperatures in thermolysis steam superheater 216 to constitute superheated steam 109a, 109b, 109c, and 109d for the thermolysis reactor 104. The remainder of medium pressure steam 224, supplemented by similar quality steam from the downstream section of heat recovery steam generator 218, is added to cooled syn-gas upstream of shift reactor 203, providing enough steam to convert some or most (e.g., up to 84%) of the carbon monoxide in the activation syn-gas to additional hydrogen, with the remainder being heated in activation reactor superheater 201 to become superheated activation steam 118.

Gas turbine compressor 220, gas turbine set 222a and 222b, back pressure steam turbine 225, and electric generator 226, together with tail-gas combustor 214 and heat recovery steam generator 218, constitute a combined cycle gas turbine power plant. In certain embodiments, most (e.g., about 60%) of the electric power is consumed by the radiant electric heating elements in the thermolysis and activation reactors, the hydrogen compressor 211, feedstock preparation and handling, pumps, and blowers. The net excess can be used for other purposes or sold to the local electric grid operator.

As the char is activated under pressure in the activation reactor 112, hot pressurized activation syn-gas 119 is generated. Activation steam superheater 201 partially cools the syn-gas while heating medium pressure steam 224 to constitute superheated activation steam 118. The activation syn-gas is further cooled in activation gas boiler 202 to a temperature suitable for conversion of carbon monoxide to hydrogen in high temperature shift reactor 203 while generating saturated high-pressure steam 230 from hot high-pressure boiler feedwater 229 heated in the downstream section of shift exit gas boiler 205. Medium pressure steam 224 is added upstream of high temperature shift reactor 203, providing enough steam to convert most (e.g., up to 84%) of carbon monoxide to hydrogen, producing hydrogen-rich syn-gas 204. Shift reactor exit gas boiler 205 finally cools the hydrogen-rich syn-gas and condenses most of the water present in the gas to produce cooled wet syn-gas 206 at a temperature suitable for efficient hydrogen recovery in pressurized swing adsorbers 209. Demister 207 removes the final traces of water droplets from the cooled wet syn-gas 206, producing cooled dry syn-gas 208. Hydrogen 210 is separated from cooled dry syn-gas 208 in pressurized swing adsorbers 209 at a pressure not materially less than the operating pressure in activation reactor 112, and is further compressed by compressor 211, and stored in pressure vessel(s) 212 as a product for sale. The hydrogen purity is preferably greater than 95% (e.g., greater than 95, 96, 97, 98, or 99%), more preferably greater than 99%. Low pressure tail gas 213, containing the remaining volatile constituents and carbon dioxide, essentially free of particulate matter, is combusted in tail gas combustor 214 as described above.

In one example of the embodiment shown in FIG. 2, 54.93 tons per hour of walnut shells at 7% moisture is reacted with 100.2 tons per hour of steam to produce 1.43 tons per hour of hydrogen, 6.59 tons per hour of activated carbon, and 12.43 tons per hour of condensate. An additional 407.61 tons per hour of air are required to combust the volatile vapors from the thermolysis reactor and the tail gas from the pressure swing adsorbers while producing 542.29 tons per hour of flue gas with negligible particulate matter.

In terms of energy, the higher heating value of the walnut shells input to the process is 890.5 MMBtu per hour, which produces 174.2 MMBtu per hour of hydrogen, 174.1 MMBtu per hour of activated carbon, and 68.3 MMBtu per hour of excess energy converted into electric power available to be supplied to the grid for an overall energy efficiency of 47%. This is higher than the average fossil-fueled, utility power plant in the U.S. at 36% and natural-gas-fired utility plant at 44%. The balance, non-recoverable waste heat, is released through the stack as a combination of latent heat and sensible heat with additional thermal losses from process equipment and plant power requirements.

The overall power balance for the embodiment shown in FIG. 2 is described in Table 1. It should be noted that by injecting pressurized steam as a thermal medium and a reagent into the thermolysis process, the gas turbine efficiency is increased from 37.2 to 45.9% while adding an extra 12.8 MW of power.

TABLE 1

ELECTRIC POWER BALANCE
FOR GAS TURBINE EXAMPLE

| Process Unit | Produced (MW) | Required (MW) |
|---|---|---|
| Thermolysis Reactor 104 | | 6.83 |
| Activation Reactor 112 | | 20.05 |
| Gas Power Producer Turbine 222b | 44.86 | |
| Steam Turbine 225 | 6.80 | |
| Boiler Feedwater Pumps | | 0.27 |
| I.D. + F.D. Blowers | | 0.95 |

TABLE 1-continued

ELECTRIC POWER BALANCE
FOR GAS TURBINE EXAMPLE

| Process Unit | Produced (MW) | Required (MW) |
|---|---|---|
| Hydrogen Compressor 211 | | 2.81 |
| Feedstock Prep & Miscellaneous | | 0.73 |
| Totals | 51.66 | 31.63 |
| Net Available for Export | 20.03 | |

During thermolysis, biomass decomposes into a number of highly reactive species, which then tend to combine with each other to form less reactive chemicals. When these chemicals are condensed, they tend to thicken (increase the viscosity of) the biomass oil (bio-oil) that is produced. This oil can be used as fuel in a gas turbine or diesel engine, but the thickened oil is less attractive. Commercially, the reactive species are more valuable so efforts have been made to quickly condense these initial species before they have had a chance to combine.

In certain embodiments, the catalysts are mixed with the biomass feed so that they can reform the early reactive species into hydrogen before they have reacted together into chemicals that are less easily reformed. Activated carbon is one of the catalysts used for reforming, and the addition of activated carbon does not impact the process of interest in any significant way. Alternatively, other catalysts could be used instead, but they are less convenient because they would have to be separated, recycled, and blended in with the biomass again.

In certain embodiments, adding preheated metal or ceramic balls to the biomass feed (e.g., for screw type pyrolysers) may allow the apparatus to quickly heat the biomass and to minimize the interactions.

Figure 3:
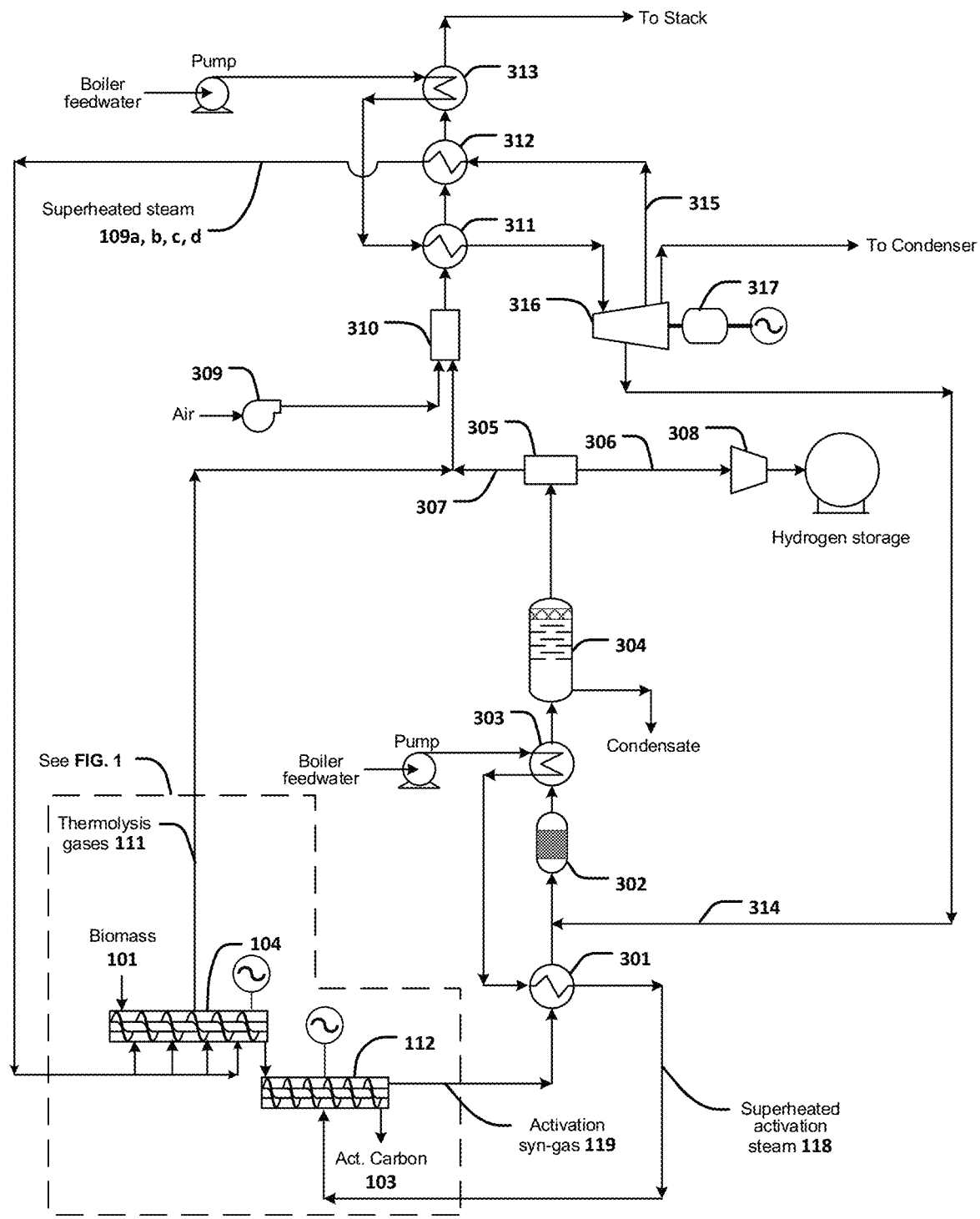

FIG. 3 depicts schematically another of several possible configurations of equipment items constituting a complete system realizing all of the objects and advantages of the present invention, notably employing a boiler and steam turbine generator. (FIG. 3 also includes a smaller scale rendition of FIG. 1 for reference.) Although this configuration results in less net electrical energy production than the combined cycle gas turbine configuration due to the lower thermal efficiency of the Rankine cycle, and is likely to be more expensive to construct due to larger heat transfer area, the fuel quality and quantity of the thermolysis products used as fuel is expected to vary considering the variety of feedstocks anticipated, and a boiler system, because of its large thermal reservoir, is more tolerant of these variations than a gas turbine train.

In this embodiment, thermolysis reactor 104 is operated at 1 to 5 psig (e.g., about 1, 1.1, 1.25, 1.5, 1.75, 2, 2.25, 2.5, 2.75, 3, 3.25, 3.5, 3.75, 4, 4.25, 4.5, 4.75, or 5) to compensate for piping and valve losses. As the dried biomass 101 is thermolysed to high-carbon char, hot thermolysis gases and vapors 111 essentially free of particulate matter are combined with pressurized swing adsorber tail gas 306, which is also essentially free of particulate matter and contains the remaining permanent gases after hydrogen separation. The combined gases and vapors are combusted in pyrolyser and tail gas combustor 310 with air from combustion air blower 309, and the hot flue gases are cooled sequentially in thermolysis combustion superheater 311, thermolysis steam reheater 312, and thermolysis combustion boiler 313. Cooled flue gas from thermolysis combustion boiler 313 is treated (e.g., as required by air pollution regulations) and discharged to atmosphere. Thermolysis combustion boiler 313 generates saturated steam from high-pressure boiler feedwater, and this steam is superheated in thermolysis combustion superheater 311 and powers extraction steam turbine 316 which runs electric generator 317. Exhaust steam from turbine 316 is condensed and the condensate returned as a portion of the required feedwater for the various boilers in the system. This low-Btu gas-fired, high pressure boiler plant produces both power for plant use and grid supply while also providing low and medium pressure process steam. Partially cooled flue gas from thermolysis combustion superheater 311 is further cooled in thermolysis steam reheater 312 which reheats low pressure extraction steam 315 from steam turbine 316 to various temperatures, constituting superheated steam 109a, 109b, 109c, and 109d for the thermolysis reactor 104. The power from electric generator 317 is consumed by the radiant electric heating elements in the thermolysis and activation reactors, the hydrogen compressor 308, feedstock preparation and handling, pumps, and blowers. The net excess is sold to the local electric grid operator.

As the char is activated under pressure in the activation reactor 112, hot pressurized activation syn-gas 119 is generated. Activation steam superheater 301 simultaneously cools the syn-gas to a temperature suitable for conversion of carbon monoxide to hydrogen in high temperature shift reactor 302 while superheating medium pressure steam to constitute superheated activation steam 118. Medium pressure steam 314 extracted from steam turbine 316 is added to the syn-gas upstream of high temperature shift reactor 302 so that enough steam is present to convert most (e.g., up to 84%) of carbon monoxide to hydrogen. Activation gas boiler 303 cools the shift reacted hydrogen-rich syn-gas to a temperature suitable for efficient hydrogen recovery in pressurized swing adsorbers 305 while simultaneously generating steam to be superheated in activation steam superheater 301. The cooled hydrogen-rich syn-gas from activation gas boiler 303 carries water vapor which is removed in condenser/demister 304. Hydrogen 306 is separated from the cooled syn-gas in pressurized swing adsorbers 305 at a pressure not materially less than the operating pressure in activation reactor 112, then further compressed by compressor 308 and stored in pressure vessel(s) as a product for sale. The hydrogen purity is preferably greater than 95% (e.g., greater than 95, 96, 97, 98, or 99%), more preferably greater than 99%.

In one example of the embodiment shown in FIG. 3, 54.93 tons per hour of walnut shells at 7% moisture is reacted with 100.2 tons per hour of steam to produce 1.43 tons per hour of hydrogen, 6.59 tons per hour of activated carbon, and 12.43 tons per hour of condensate. An additional 230.5 tons per hour of air are required to combust the volatile vapor from the thermolysis reactor and the tail gas from the pressure swing adsorbers while producing 365.27 tons per hour of flue gas with negligible particulate matter.

In terms of energy, the higher heating value of the walnut shells input to the process is 890.5 MMBtu per hour which produces 174.2 MMBtu per hour of hydrogen, 174.1 MMBtu per hour of activated carbon, and 52.0 MMBtu per hour of excess electricity available to be supplied to the grid, for an overall energy efficiency of 44%. The balance, non-recoverable waste heat, is released through the stack as a combination of latent heat and sensible heat with additional thermal losses from process equipment.

The overall power balance for the example of the embodiment shown in FIG. 3 is described in Table 2.

TABLE 2

ELECTRIC POWER BALANCE FOR STEAM TURBINE EXAMPLE

| Process Unit | Produced (MW) | Required (MW) |
|---|---|---|
| Thermolysis Reactor 104 | | 7.41 |
| Activation Reactor 112 | | 20.05 |
| Steam Turbine 316 | 47.54 | |
| Boiler Feedwater Pumps | | 0.78 |
| I.D. + F.D. Blowers | | 0.51 |
| Hydrogen Compressor 308 | | 2.81 |
| Feedstock Prep & Miscellaneous | | 0.73 |
| Totals | 47.54 | 32.29 |
| Net Available for Export | 15.25 | |

Biomass is primarily composed of three chemical materials: cellulose, hemicellulose, and lignin; with lesser amounts of terpenes and oils. The composition of these components varies with biomass species and (to a lesser extent) with growth conditions and geographical location. The chemical analyses of various forms of biomass can be found in sources such as the Biomass Compositional Analysis Handbook published by the National Renewable Energy Laboratory (NREL).

The flexibility provided by the apparatus described in FIG. 1 facilitates the vapor phase extraction of various fractions of the thermolyzed components of biomass, separated by temperature. In particular, the products formed by the steam thermolysis of biomass in thermolysis reactor 104 can be advantageously partitioned into three or more vapor streams as shown in FIG. 5.

Figure 5:
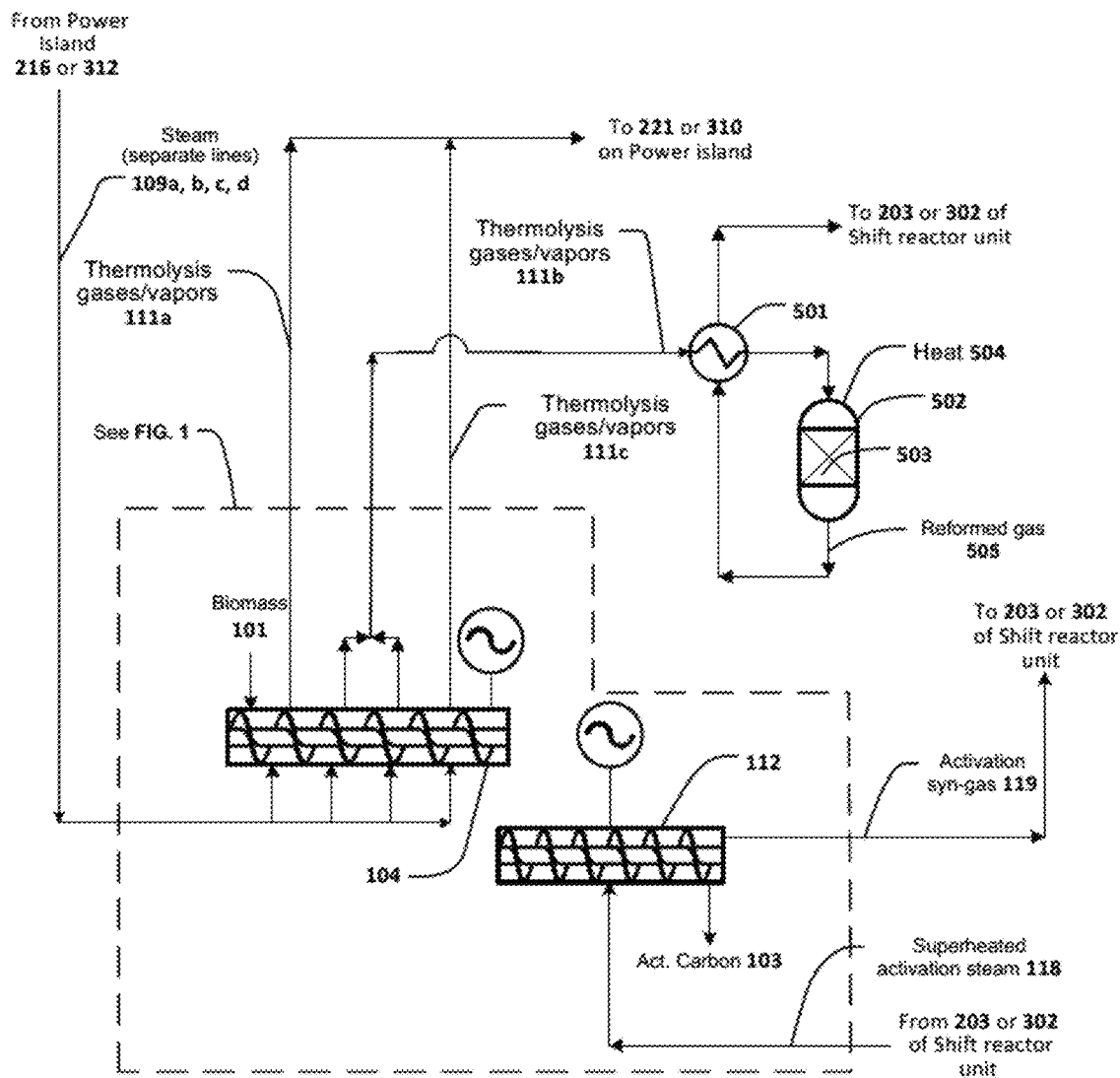
FIG. 5 depicts an embodiment of the inventive system for making hydrogen from the volatile materials from different sections of the screw pyrolyser, which uses different operating conditions (e.g., temperature or catalyst) to vapors coming from different sections of the screw pyrolyser.

FIG. 5 depicts an embodiment for making hydrogen from the volatile materials from different sections of the screw pyrolyser, which uses different operating conditions (e.g., temperature or catalyst) to vapors coming from different sections of the screw pyrolyser.

Thermolysis gases 111a emanate from the drying zone of screw reactor 104. Stream 111a is comprised of steam mixed with minor amounts (0-6% by weight) of terpenes or essential oils dependent upon the source of the biomass 101. This stream can be condensed as required to recover sufficiently valuable chemicals or directed to the gas turbine combustor 221 as shown in FIG. 2 or to the tail gas combustor 310 as shown in FIG. 3.

Thermolysis gases/vapors 111b result from steam thermolysis of the cellulosic and hemi-cellulosic components of biomass 101 plus some volatile components derived from hydrolytic scission of the lignin fraction. This vapor stream contains carbon dioxide with lesser amounts of the permanent gases methane, carbon monoxide and hydrogen. The other major constituent of 111b is a vaporized liquid comprising a multitude of low molecular weight chemical components which can be readily catalytically reformed by steam into carbon oxides and hydrogen.

Thermolysis gases 111c result from high temperature decomposition of the remaining lignin fraction of the biomass and fracture into polycyclic hydrocarbons. These refractory aromatic chemicals are more resistant to catalytic steam reforming and thus may be better combined with stream 111a and directed to fuel use.

As required, other vapor fractions could be separated, if sufficiently valuable materials are recoverable.

In certain embodiments, the process of FIG. 5 is designed to augment the hydrogen product stream of FIG. 2 or FIG. 3, and it can be conveniently incorporated into either of the flow diagrams of FIG. 2 or FIG. 3. In FIG. 5, the middle fraction, thermolysis gases/vapors 111*b*, is directed to a reforming unit comprised of preheater 501 which provides for heat recovery from the hot reformed gas 505 and a catalytic reforming reactor 502 which serves to convert the vapor fraction of 111*b* into the permanent gases carbon monoxide (CO), carbon dioxide ($CO_2$), methane ($CH_4$), and hydrogen ($H_2$) by reaction with the steam already present in 111*b*. The catalyst 503 used in catalytic reforming reactor 502 may be a conventional nickel reforming catalyst or other such catalysts known to facilitate reforming of biomass vapors, e.g., activated carbon, dolomite, zeolites, alumina, or even two-part combinations, such as dolomite combined with conventional nickel catalyst. The overall reaction is exothermic and requires the addition of heat 504. As known to those skilled in the art, this energy could take the form of electrical heating elements (either externally or internally applied), further preheating by hot gas in a heat exchanger or by partial oxidation.

The reformed gas from preheater 501 is piped to the shift reactor module 203 or 302 as shown in FIG. 2 or FIG. 3 respectively where carbon monoxide is converted into a hydrogen rich synthesis gas and subsequently into purified hydrogen. In certain embodiments, to minimize the power required for compressing hydrogen to commercial distribution pressure, all the equipment shown in FIG. 5 is operated at a pressure in the range from 150 to 1,000 pounds per square inch gauge (e.g., about 150, 200, 250, 300, 350, 400, 500, 600, 700, 800, 900, or 1000) and preferably in the range from 300 to 600 pounds per square inch gauge (e.g., about 150, 200, 250, 300, 350, 400, 450, 500, 550, or 600).

One catalyst that can be used for hydrogen reforming is activated carbon, which is produced in other aspects of the process. In certain embodiments, the process can also reactivate any degenerated activated carbon catalyst.

In another embodiment of the process, additional hydrogen can be produced from the thermolysis gases/vapors 111*c* by utilizing this stream as the source of heat 504 required by catalytic reformer 502 of FIG. 5. This embodiment is described in FIG. 6. The volatile vapors from the steam thermolysis of carbonaceous materials in thermolysis reactor 104 may be advantageously partitioned into three or more vapor streams.

Thermolysis gases/vapors 111*b* are preheated to between 1,300 and 1,650° F. (ca. 704 and 899° C.) in two stages: First, by thermal recovery in heat exchanger 604 using heat from the reformed gas 608 and second, by mixing with partially oxidized gases 603 formed by combustion of part or all of thermolysis gases 111*c* with an oxygen source 601 from air or enriched air or pure oxygen in partial oxidation reactor 602, which also serves to thermally reform stream 111*c* with or without the use of a high temperature reforming catalyst. Thermolysis gases/vapors 111*b* excess to the thermal requirements of catalytic reforming reactor 606 is directed to fuel use in boilers 221 or 310 of FIG. 2 and FIG. 3 respectively.

Figure 6:
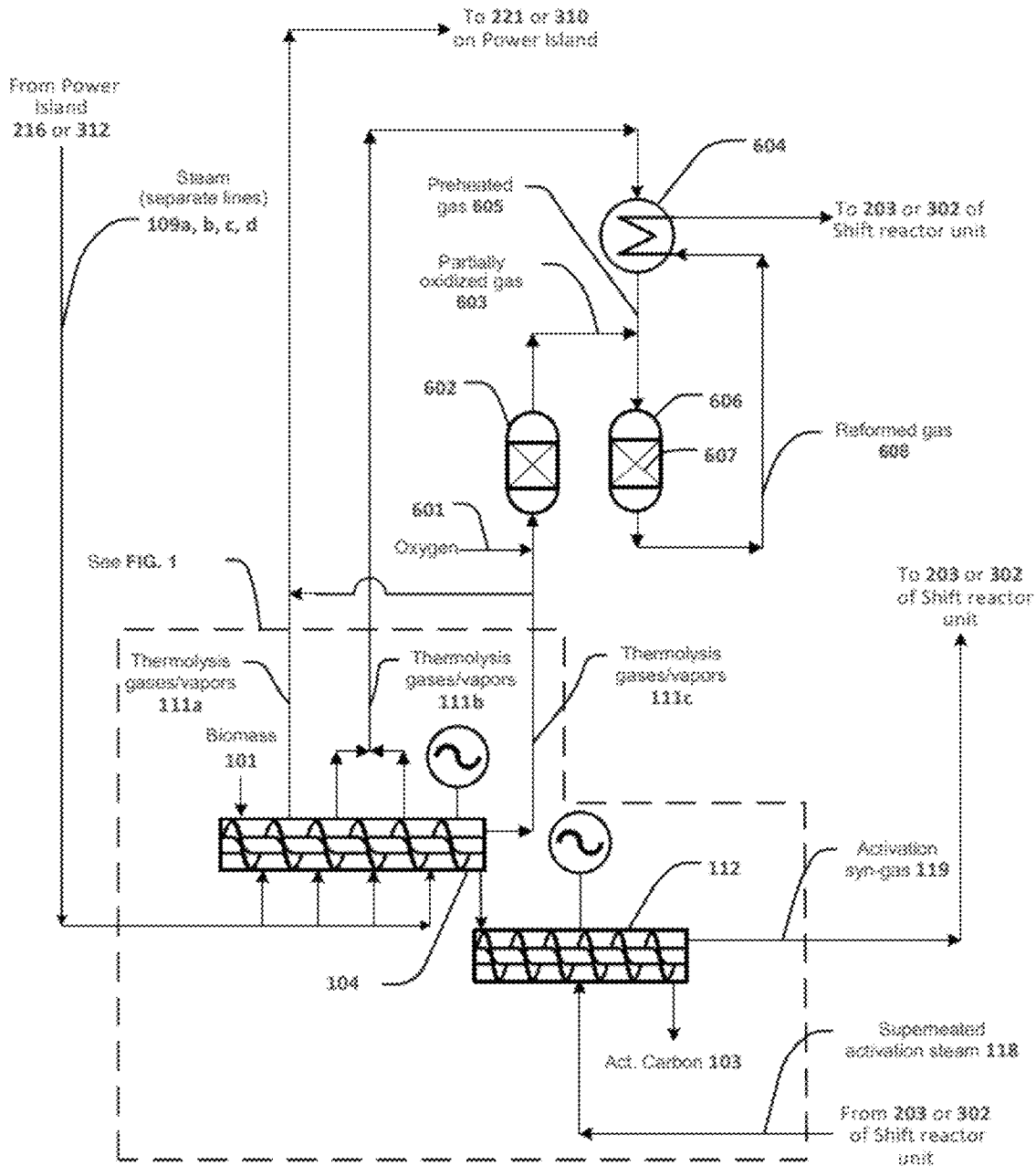
FIG. 6 depicts an embodiment of the inventive system in which the volatile vapors from the steam thermolysis of carbonaceous materials in thermolysis reactor 104 are advantageously partitioned into three or more vapor streams.

The combined hot gas stream is then reformed in catalytic reforming reactor 606 using conventional nickel reforming catalyst 607 or other catalysts known to those skilled in the art, including but not limited to ruthenium-based materials, activated carbon, dolomite, zeolites, and alumina. A two-step catalytic approach can also be used with two separate catalysts such as a cheaper dolomite or activated carbon combined with a nickel or ruthenium catalyst. Catalytic reforming reactor 606 could be a conventional fixed bed unit or a fluidized bed reactor or other similar means known to those skilled in the art. After heat recovery in heat exchanger 604 the cooled reformed gas is directed to the shift reactor module 203 or 302 as shown in FIG. 2 or FIG. 3 respectively and processed as described in previous embodiments FIG. 2 or FIG. 3 to produce a stream of high purity hydrogen. All of the equipment shown in FIG. 6 is operated at a pressure from 150 to 1,000 pounds per square inch gauge (e.g., about 150, 200, 250, 300, 350, 400, 500, 600, 700, 800, 900, or 1000) and preferably in the range from 300 to 600 pounds per square inch gauge (e.g., about 150, 200, 250, 300, 350, 400, 450, 500, 550, or 600).

In certain embodiments, to maximize the total hydrogen produced, all the thermolysis gases/vapors 111*c* are directed to partial oxidation reactor 602 to thermally reform the refractory fraction of this gas before being cooled as required to provide the necessary heat for catalytic reforming reactor 606. In certain embodiments, the excess heat alternatively could be used to offset the electrical power demand of activation reactor 112 by recycling a portion of the gas to 112.

In certain embodiments, all or part of the reformer catalyst can be introduced with the biomass feed 101 to provide in situ reforming of the volatiles released during thermolysis before they have an opportunity to combine into more recalcitrant molecules. This is particularly beneficial if the catalyst is activated carbon since any deactivation caused during the reforming of polyaromatic hydrocarbons towards the discharge end of the thermolysis reactor 104 can be rectified as the spent activated carbon is reactivated in the activation reactor 112. In certain embodiments, other catalysts such as spherical alumina particles, either alone on impregnated with an effective agent such as nickel or ruthenium, can also be used. Any coking or deactivation of the alumina-based catalyst would also be reversed as it transited the activation reactor 112 and is exposed to the high temperature steam environment present in 112. The spherical alumina catalyst would be separated from the activated carbon product, and if it was sufficient larger than the activated carbon particles, this could be accomplished by simple screening. An additional benefit can be attained by recycling the catalyst from the activation reactor in a hot state or even by reheating the catalyst, as is done with screw reactors which are heated by hot, recycled ceramic or metal balls. With sufficient recirculation of catalyst, the drying section of the thermolysis reactor could be reduced due to the improved heat transfer created by intimate contact of the recycled solids and the biomass.

All publications, patents, and patent applications mentioned in this specification are indicative of the level of skill of those skilled in the art to which the invention pertains, and they are herein incorporated by reference to the same extent as if each were set forth in full.

Although the description above contains many specifics, these should not be construed as limiting the scope of the invention, but as merely providing illustrations of some of the presently conceptualized embodiments of the invention. It will be appreciated that the scope of the invention fully encompasses other embodiments which may become obvious to those skilled in the art; however, the definitive scope of the invention is determined by the appended claims and their legal equivalents.

What is claimed is:

1. A system for continuous, concurrent production of activated carbon, hydrogen, process steam, and electric power from carbonaceous matter, comprising:
   a thermolysis reactor, wherein carbonaceous matter is processed in individually temperature-controlled zones for sequentially drying, torrefying, pyrolysing, and devolatilizing the carbonaceous matter to produce char and volatile materials, the thermolysis reactor comprising:
a carbonaceous matter inlet,
a char outlet,
means for moving the carbonaceous matter from the carbonaceous matter inlet to the char outlet,
means for admitting steam at various locations within the zones for sequentially drying, torrefying, pyrolysing, and devolatilizing the carbonaceous matter,
a first radiant electric heat distribution system acting to control the temperature within a devolatilization zone, and
an array of volatile materials outlets; and
a pressurized activation reactor, the pressurized activation reactor comprising:
a char inlet integrally connected to the char outlet of the thermolysis reactor and configured to receive char from the char outlet,
an activated carbon outlet,
means for moving the char from the char inlet to the activated carbon outlet, means for admitting steam, the steam acting as a reactant for char activation,
a second radiant electric heat distribution system acting to provide an endothermic heat of reaction, and
a gas outlet.

2. The system of claim 1, further comprising:
a power island, the power island providing power to the first and the second radiant electric heat distribution systems, the power island further providing steam to the thermolysis reactor and the pressurized activation reactor.

3. The system of claim 1, wherein the char is reacted with pressurized steam to produce activated carbon and pressurized synthesis gas, and wherein the system further comprises:
means for recovering heat from the pressurized synthesis gas by generating steam while cooling and dehumidifying the pressurized synthesis gas and producing cooled and dehumidified pressurized synthesis gas; and
a hydrogen purification system producing purified hydrogen and combustible tail gas from the cooled and dehumidified pressurized synthesis gas.

4. A system for continuous, concurrent production of activated carbon, hydrogen, process steam, and electric power from carbonaceous matter, comprising:
a thermolysis reactor, wherein carbonaceous matter is processed in individually temperature-controlled zones for sequentially drying, torrefying, pyrolysing, and devolatilizing the carbonaceous matter to produce char and volatile materials, the thermolysis reactor comprising
a carbonaceous matter inlet,
a char outlet,
means for moving the carbonaceous matter from the carbonaceous matter inlet to the char outlet,
means for admitting steam at various locations within the zones for sequentially drying, torrefying, pyrolysing, and devolatilizing the carbonaceous matter, the steam acting variously to facilitate chemical reactions, to sweep volatile materials out of the thermolysis reactor and to provide controlled thermal energy,
a first radiant electric heat distribution system acting to control the temperature within a devolatilization zone, and
an array of volatile materials outlets; and a pressurized activation reactor;
the pressurized activation reactor, wherein the char is reacted with pressurized steam to produce activated carbon and pressurized synthesis gas, the pressurized activation reactor comprising:
a char inlet integrally connected to the char outlet of the thermolysis reactor and configured to receive char from the char outlet,
an activated carbon outlet,
means for moving the char from the char inlet to the activated carbon outlet,
means for admitting steam, the steam acting as a reactant for char activation,
a second radiant electric heat distribution system acting to provide an endothermic heat of reaction, and
a pressurized synthesis gas outlet;
separation means at the junction of the thermolysis reactor and the pressurized activation reactor acting to effectively isolate the interior environment of the thermolysis reactor from the interior environment of the pressurized activation reactor while allowing passage of the char from the thermolysis reactor into the pressurized activation reactor;
means for admitting carbonaceous feed into the thermolysis reactor and for discharging activated carbon from the pressurized activation reactor while maintaining various working pressures therein and minimizing the ingress of air from and egress of gases and vapors to atmosphere;
means for recovering heat from the pressurized synthesis gas by generating steam while cooling and dehumidifying the pressurized synthesis gas and producing cooled and dehumidified pressurized synthesis gas;
a hydrogen purification system producing purified hydrogen, and combustible tail gas, from the cooled and dehumidified pressurized synthesis gas;
means for compression and storage of the purified hydrogen;
a power island comprising means for combustion, process steam raising, heat exchange, and electric power generation, fueled by the volatile materials discharged from the thermolysis reactor and the tail gas discharged from the hydrogen purification system;
means for delivering electric power from the power island to the first radiant electric heat distribution system of the thermolysis reactor and the second radiant electric heat distribution system of the pressurized activation reactor; and
means for delivering steam from the power island to the thermolysis reactor and the pressurized activation reactor, and steam from the means for recovering heat from the pressurized synthesis gas to the pressurized activation reactor.

5. The system of claim 4, wherein the
means for moving carbonaceous matter through the thermolysis reactor and the means for moving the char through the pressurized activation reactor is a screw means selected from the group including a single screw with cut flights, a single screw with mixing paddles, a shaftless screw, multiple identical screws, screws with flights having pitches differing along the shaft length, and screws with shaft diameter differing along the shaft length.

6. The system of claim 5, wherein the means for moving carbonaceous matter through the thermolysis reactor and the means for moving the char through the pressurized activation reactor variously is a traveling grate with mixing plows.

7. The system of claim 4, wherein the first radiant electric heat distribution system of the thermolysis reactor and the second radiant electric heat distribution system of the pressurized activation reactor comprises an array of individually replaceable electric radiant heating elements disposed inside protective temperature and pressure-resistant tubes and mounted substantially above the means for moving the carbonaceous matter through the thermolysis reactor and the means for moving the char through the pressurized activation reactor.

8. The system of claim 4,
wherein the means for admitting steam to the thermolysis reactor is an array of apertures disposed along the bottom thereof, but separately within the individually thermally controlled zones for sequentially drying, torrefying, pyrolysing, and devolatilizing the carbonaceous matter, and
wherein the means for admitting steam to the pressurized activation reactor is through an array of apertures disposed along the bottom thereof.

9. The system of claim 4, wherein a torrefaction zone is operated at 375 to 600° F. (ca. 191 to 316° C.), a pyrolysis zone is operated at 750 to 1050° F. (ca. 399 to 566° C.), and the devolatilization zone is operated at 1300 to 1350° F. (ca. 704 to 732° C.).

10. The system of claim 4, wherein the drying and torrefaction zones, the torrefaction and pyrolysis zones, the pyrolysis and devolatilization zones, and the drying, torrefaction, and pyrolysis zones, are variously combined into single zones.

11. The system of claim 4, wherein a working pressure of the various working pressures is in the range of 150 to 1,000 pounds per square inch gauge.

12. The system of claim 4, wherein a working pressure of the various working pressures is in the range of 300 to 600 pounds per square inch gauge.

13. The system of claim 4, wherein the thermolysis reactor is operated at working pressures either the same as or differing from the working pressure in the pressurized activation reactor.

14. The system of claim 4, wherein the thermolysis reactor and the pressurized activation reactor are conjoined as a single reactor operated at a single working pressure.

15. The system of claim 4, wherein the pressurized activation reactor is inoperative.

16. The system of claim 4, wherein the thermolysis reactor is inoperative.

17. The system of claim 4, wherein the pressurized synthesis gas is enriched in hydrogen in a shift conversion reactor.

18. The system of claim 4, wherein the hydrogen purification system is a pressurized swing adsorber.

19. The system of claim 4, further comprising means to recover selected chemicals by controlled condensation of a portion of the volatile materials discharged from the thermolysis reactor.

20. The system of claim 1, wherein a portion of the char produced in the thermolysis reactor is diverted and the remainder enters the char inlet of the pressurized activation reactor.

21. The system of claim 4, wherein the volatile materials discharged from the thermolysis reactor are partitioned into three or more streams.

22. The system according to claim 21, wherein the volatile materials discharged from the thermolysis reactor comprise streams discharged from the respective zones for drying, torrefying, pyrolysing, and devolatilizing the carbonaceous matter.

23. The system of claim 4, further comprising:
means for directing combined volatile materials discharged from the zones for torrefying and pyrolysing carbonaceous matter in the thermolysis reactor to a catalytic reformer.

24. The system of claim 23, wherein the combined volatile materials discharged from the zones for torrefying and pyrolysing carbonaceous matter in the thermolysis reactor are heated before the catalytic reformer at least partially by gases exiting the catalytic reformer.

25. The system of claim 4, further comprising:
means for directing the volatile materials discharged from the zone for devolatilizing the carbonaceous matter in the thermolysis reactor to a partial oxidation reactor.

26. A method for continuous, concurrent production of activated carbon, purified hydrogen, process steam, and electric power from carbonaceous matter, comprising:
sequentially drying, torrefying, pyrolysing, and devolatilizing the carbonaceous matter in a series of zones of a thermolysis reactor by admitting the process steam to the zones and producing volatile materials and a resulting char,
wherein the process steam facilitates chemical reactions, sweeps the volatile materials out of the thermolysis reactor and provides controlled thermal energy, and
wherein a first radiant electric heat distribution system controls the temperature within a devolatilization zone, and an array of outlets permits release of the volatile materials.

27. The method of claim 26, further comprising:
activating the resulting char in a pressurized activation reactor by admitting the process steam,
wherein the process steam facilitates the formation of pores in the char, and
wherein a second radiant electric heat distribution system controls the temperature within the pressurized activation reactor, an outlet permits release of a pressurized synthesis gas, and a separate outlet permits discharge of the activated carbon.

28. The method of claim 26, further comprising:
recovering heat from the pressurized synthesis gas by generating steam while cooling and dehumidifying the pressurized synthesis gas and producing cooled and dehumidified pressurized synthesis gas,
producing the purified hydrogen and a combustible tail gas from the cooled and dehumidified pressurized synthesis gas in a hydrogen purification system,
compressing and storing the purified hydrogen, and
combusting the volatile materials and the combustible tail gas in a power island,
wherein the power island raises the process steam consumed in the thermolysis reactor and the pressurized activation reactor, and
wherein the power island generates the electric power consumed by the first and second radiant electric heat distribution systems.

29. The method of claim 26, further comprising:
recovering selected chemicals by controlled condensation of a portion of the volatile materials discharged from the thermolysis reactor.

30. The method according to claim 26, further comprising:
diverting a portion of a char produced in the thermolysis reactor; and admitting a remainder of the char into a char inlet of a pressurized activation reactor.

31. The method according to claim 26, further comprising:
partitioning the volatile materials discharged from the thermolysis reactor into three or more streams.

32. The method according to claim 31, wherein the volatile materials discharged from the thermolysis reactor comprise streams discharged from the respective zones for drying, torrefying, pyrolysing, and devolatilizing the carbonaceous matter.

33. The method according to claim 26, further comprising:
directing combined volatile materials discharged from the zones for torrefying and pyrolysing carbonaceous matter in the thermolysis reactor to a catalytic reformer.

34. The method according to claim 33, wherein the combined volatile materials discharged from the zones for torrefying and pyrolysing carbonaceous matter in the thermolysis reactor are heated before the catalytic reformer at least partially by gases exiting the catalytic reformer.

35. The method according to claim 26, further comprising:
directing the volatile materials discharged from the zone for devolatilizing the carbonaceous matter in the thermolysis reactor to a partial oxidation reactor.

* * * * *